US010509758B1

(12) United States Patent
Habusha et al.

(10) Patent No.: US 10,509,758 B1
(45) Date of Patent: Dec. 17, 2019

(54) EMULATED SWITCH WITH HOT-PLUGGING

(71) Applicant: Amazon Technologies, Inc., Seattle, WA (US)

(72) Inventors: Adi Habusha, Moshav Alonei Abba (IL); Georgy Zorik Machulsky, San Jose, CA (US); Nafea Bshara, San Jose, CA (US); Tal Zilcer, Hadera (IL)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 15/718,955

(22) Filed: Sep. 28, 2017

(51) Int. Cl.
*G06F 13/00* (2006.01)
*G06F 13/40* (2006.01)
*G06F 13/42* (2006.01)
*G06F 13/10* (2006.01)

(52) U.S. Cl.
CPC ........ *G06F 13/4081* (2013.01); *G06F 13/105* (2013.01); *G06F 13/4022* (2013.01); *G06F 13/4282* (2013.01); *G06F 2213/0026* (2013.01); *G06F 2213/4004* (2013.01)

(58) Field of Classification Search
CPC ............. G06F 13/4081; G06F 13/4022; G06F 13/4282; G06F 13/105; G06F 2213/4004; G06F 2213/0026
See application file for complete search history.

(56) References Cited

U.S. PATENT DOCUMENTS

| 10,013,388 | B1* | 7/2018 | Wang | G06F 12/0661 |
| 2008/0228971 | A1* | 9/2008 | Rothman | G06F 9/45558 710/104 |
| 2008/0256284 | A1* | 10/2008 | Evoy | G06F 13/4022 710/316 |
| 2010/0211946 | A1* | 8/2010 | Elzur | G06F 9/45537 718/1 |
| 2012/0137292 | A1* | 5/2012 | Iwamatsu | G06F 9/45558 718/1 |
| 2012/0254866 | A1* | 10/2012 | Iwamatsu | G06F 9/45558 718/1 |
| 2013/0159686 | A1* | 6/2013 | Graham | G06F 9/5077 713/1 |

(Continued)

OTHER PUBLICATIONS

PCI Special Interest Group (SIG), "PCIe Hot Plug Specification." PCI Local Bus, Jun. 20, 2001, 40 pages, Revision 1.1.

*Primary Examiner* — Jing-Yih Shyu
(74) *Attorney, Agent, or Firm* — Kilpatrick Townsend & Stockton LLP

(57) ABSTRACT

Provided are systems and methods for hot-plugging emulated peripheral devices (e.g., endpoints) into host devices that either have a hypervisor that does not support virtualized peripheral device or that do not include a hypervisor. In various implementations, a configurable peripheral device can emulate a switch that includes upstream ports and downstream ports. When a new endpoint device is requested, the configurable peripheral device can, using an emulation configuration for the new endpoint device, generate an emulation for the new endpoint device. The configurable peripheral device can connect the endpoint device to a downstream port, and then trigger a hot-plug mechanism, through which the host device can add the new endpoint device to the known hardware of the host device.

23 Claims, 10 Drawing Sheets

(56) References Cited

U.S. PATENT DOCUMENTS

| | | | |
|---|---|---|---|
| 2013/0160002 A1* | 6/2013 | Graham | G06F 9/45558 718/1 |
| 2014/0040672 A1* | 2/2014 | Saghi | G06F 9/30101 714/45 |
| 2016/0098365 A1 | 4/2016 | Bshara et al. | |
| 2017/0046295 A1* | 2/2017 | Schwemmer | G06F 13/4295 |
| 2017/0118115 A1* | 4/2017 | Tsuji | G06F 13/14 |

* cited by examiner

EMULATED SWITCH WITH HOT-PLUGGING

BACKGROUND

Peripheral devices can be used to add functionality to, or extend the capabilities of, a computing system. For example, peripheral devices can be added to a computing system to give the computing system output functionality, including the ability to display using monitors or print using printers. Other examples of peripheral devices include input devices (e.g., keyboards, mice, touchpads, etc.) storage devices, network interfaces, and so on. Because the peripheral devices attached to a computing system can be added or changed, peripheral devices provide a great deal of flexibility in constructing computing systems.

In some cases, a peripheral device can be "hot-plugged" or "hot-swapped" into or out of a host system. To hot-plug or hot-swap a component means to physically insert or physically remove the component from a host system while the host system is powered on, and possibly while the host system is in active operation. Without hardware and/or software support for hot-plugging, the host system would need to be powered off before a component can be added or removed.

BRIEF DESCRIPTION OF THE DRAWINGS

Various embodiments in accordance with the present disclosure will be described with reference to the drawings, in which.

DETAILED DESCRIPTION

Figure 1A:
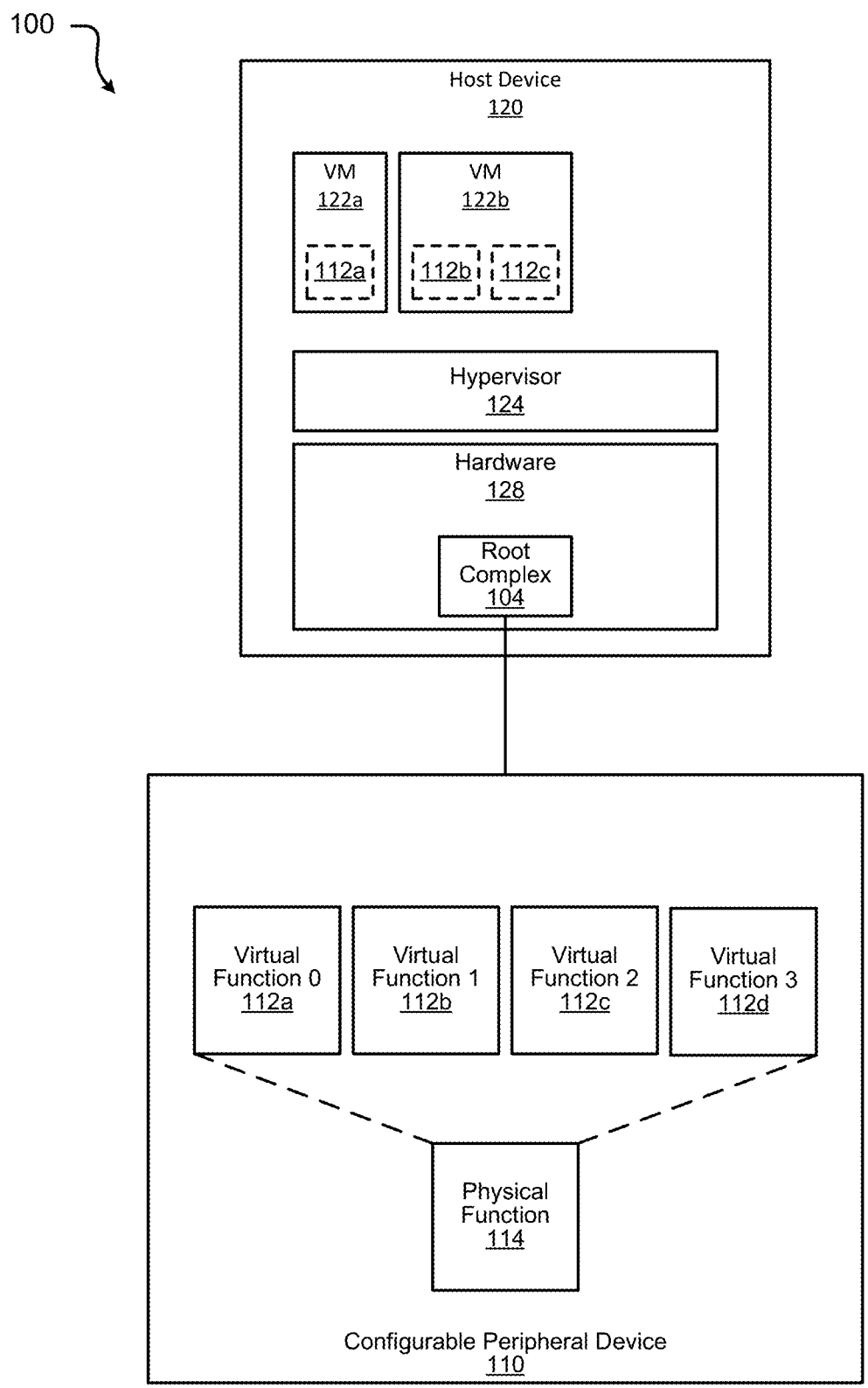
FIGS. 1A-1B illustrate an example of a system that includes a configurable peripheral device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Peripheral devices can add functionality to, or extend the capabilities of, a computing system. Examples of peripheral devices include input devices (e.g., keyboards, mice, touchpads, etc.) storage devices, network interfaces, and so on. Because the peripheral devices attached to a computing system can be added or changed, peripheral devices provide a great deal of flexibility in constructing computing systems.

Peripheral devices can be connected internally or externally and can communicate with the computing system—which can be referred to as the host system or host device—using a bus or bus complex. A bus can connect multiple peripheral devices to the host system. A bus complex can include multiple buses, connected together using switches and/or bridges. A peripheral device that does not include switching or bridging capability can also be referred to as an endpoint device. A host device and peripheral devices can intercommunicate across a bus complex using a bus protocol, which can define the transactions that can be transmitted on a bus. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

Peripheral device can be "hot-plugged" or "hot-swapped" into or out of a host system. To hot-plug or hot-swap a component can include physically inserting or physically removing the component from a host system while the host system is powered on, and possibly while the host system is in active operation. Without hardware and/or software support for hot-plugging, the host system would need to be powered off before a component can be added or removed.

Various hot-plug mechanisms exist. For example, the Peripheral Component Interconnect Express (PCIe) specification provides for hot-plug of PCIe-compatible components into a PCIe slot. A computing system that supports PCIe hot-plug includes hardware support, in the form of PCIe slots capable of accepting a device while the computing system is power on, detecting insertion or removal of a device, sending a signal to the operating system to indicate insertion or removal of a device, and/or providing power to a device when the device has been inserted. In some cases, the Basic Input/Output System (BIOS) of the computing system may also need to support hot-plug, for example by being able to dynamically modify power requirements when devices are added or removed. A computing system that supports PCIe hot-plug also includes software support. Specifically, the operating system may be configured with procedures for adding or removing a hot-plugged device, including, for example, conducting device discovery and configuring a new device. Configuration of the new device can include assigning memory addresses to the new device and possibly reorganizing memory assigned to other devices.

Examples of other types of devices that can be hot-plugged include Universal Serial Bus (USB) devices, Institute of Electrical and Electronics Engineers (IEEE) 1394 (known as Firewire) devices, and others.

In some cases, a computing system can be configured to execute virtual machines. A virtual machine is an emulated computer system running on the hardware of a physical computer system. A virtual machine may also be referred to as a guest or guest machine, and the physical computer system on which a virtual machine is running may be referred to as a host, host machine, or host device. A virtual machine can include a particular emulated hardware configuration, including a particular processor, amount of memory, and/or available peripheral devices, which may be the same as or different from the hardware of underlying physical computer system. From the perspective of software executing in the virtual machine, the hardware of the virtual machine is indistinguishable from physical hardware, even though some of the virtual hardware may not have a physical corollary.

A virtual machine can execute operating system, which may be different than the operating system running on the underlying physical computer system. The virtual machine's operating system may also be referred to as the guest operating system, and the operating system executing on the host device may be referred to as the host operating system. The guest operating system can provide a platform for user applications that can executing within only within the virtual machines, and which have access only to the resources provided by the virtual machine. The virtual machine may make some or all of the resources of the physical computer system available to a virtual operating system and applications. Alternatively or additionally, the virtual machine may present emulated physical resources to the operating system or applications. The physical computer system may be able to host multiple virtual machines, with the virtual machines sharing the physical computer system's hardware resources.

In some cases, software called a hypervisor or virtual machine manager manages the virtual machines, including, for example, managing launching new virtual machines, removing virtual machines, controlling virtual machines' access to the physical hardware resources of the host device, and/or emulating hardware resources that may not have a physical equivalent, among other things. In some cases, the hypervisor is a component of the host operating system.

Virtual machines can enable multiple users to make use of the system host system at the same time, or can enable one user to use one physical system as several distinct systems. Similar to physical computing systems, virtual machines can operate in isolation from one another, so that the operations of one virtual machine do not affect the operations of another.

Also similar to physical machines, a virtual machine's hardware configuration is determine when the virtual machine is brought up. Sometimes, the operator of a virtual machine may want to change the hardware of the virtual machine, for example by adding a peripheral device. For example, a virtual machine operator may want to have multiple network interfaces to isolate network traffic types and/or to separate virtual machines having a network interface from virtual machines that do not have a network interface. In these and other examples, the virtual machine operator may want to dynamically add or remove network interfaces as usage of a virtual machine changes or network conditions change. Alternatively or additionally, the virtual machine operator may want to move an existing network interface to another virtual machine, for example to preserve the configuration of the network interface when the virtual machine to which the network interface was connected goes down.

In some implementations, a peripheral device that includes virtualization can enable a host system to dynamically add peripheral devices to a virtual machine. For example, a PCI device that includes Single Root-Input/Output Virtualization (SR-IOV) can include a physical function and multiple virtual functions, where each virtual function corresponds to the physical function. The physical function can include hardware and software for, for example, a network interface, a storage device, graphics processing unit, or some other peripheral device functionality. In this example, when a virtual machine requests that the PCI device be added to the virtual machine, the hypervisor can attach an available virtual function to the virtual machine. The hypervisor can further provide the virtual machine access to the virtual function, for example using a passthrough mechanism. The virtual machine can then use the virtual function to use the physical functionality of the PCI device.

In some cases, however, a host system's hypervisor may not support virtualized peripheral devices, and thus may not be able to make use of virtual functions when a virtual machine requests a new peripheral device. In some cases, a host system may not have a hypervisor at all, such as is the case with so-called "bare metal" systems, where a virtual machine has been installed directly on the hardware of the host system, rather than within the host operating system.

Host devices—both those that have hypervisors and those that do not—may support "hot-plugging" or "hot-swapping" of peripheral devices. To hot-plug or hot-swap a component means to physically insert or physically remove the component from a host system while the host system is powered on, and possibly while the host system is in active operation. Without hardware and/or software support for hot-plugging, the host system would need to be powered off before a component can be added or removed.

In various implementations, a configurable peripheral device can be configured to emulate the components of a switch, including upstream ports and downstream ports. The emulated switch, in this context, can be used to attach the configurable peripheral device to a bus complex of a host device. When a virtual machine executing on the host device requests that a new peripheral device be added to the virtual machine, the configurable peripheral device can generate a new, emulated endpoint that includes the functionality of the new peripheral device. The configurable peripheral device can add the new endpoint to a downstream port of the emulated switch. The configurable device can further use a hot-plug feature of the host device to cause the new endpoint to be hot-plugged to the virtual machine.

The configurable peripheral device can thus enable hot-plugging of devices in a system that has a hypervisor that does not support virtual devices or in a system that does not include a hypervisor. Additionally, because the hot-plugged devices are emulated by the configurable device, physical devices need not be added to the system. The configurable device can, furthermore, be configured to increase or decrease the number of slots available for hot-plugging, and be configured to simultaneously support a wide array of emulated devices.

Figure 1B:
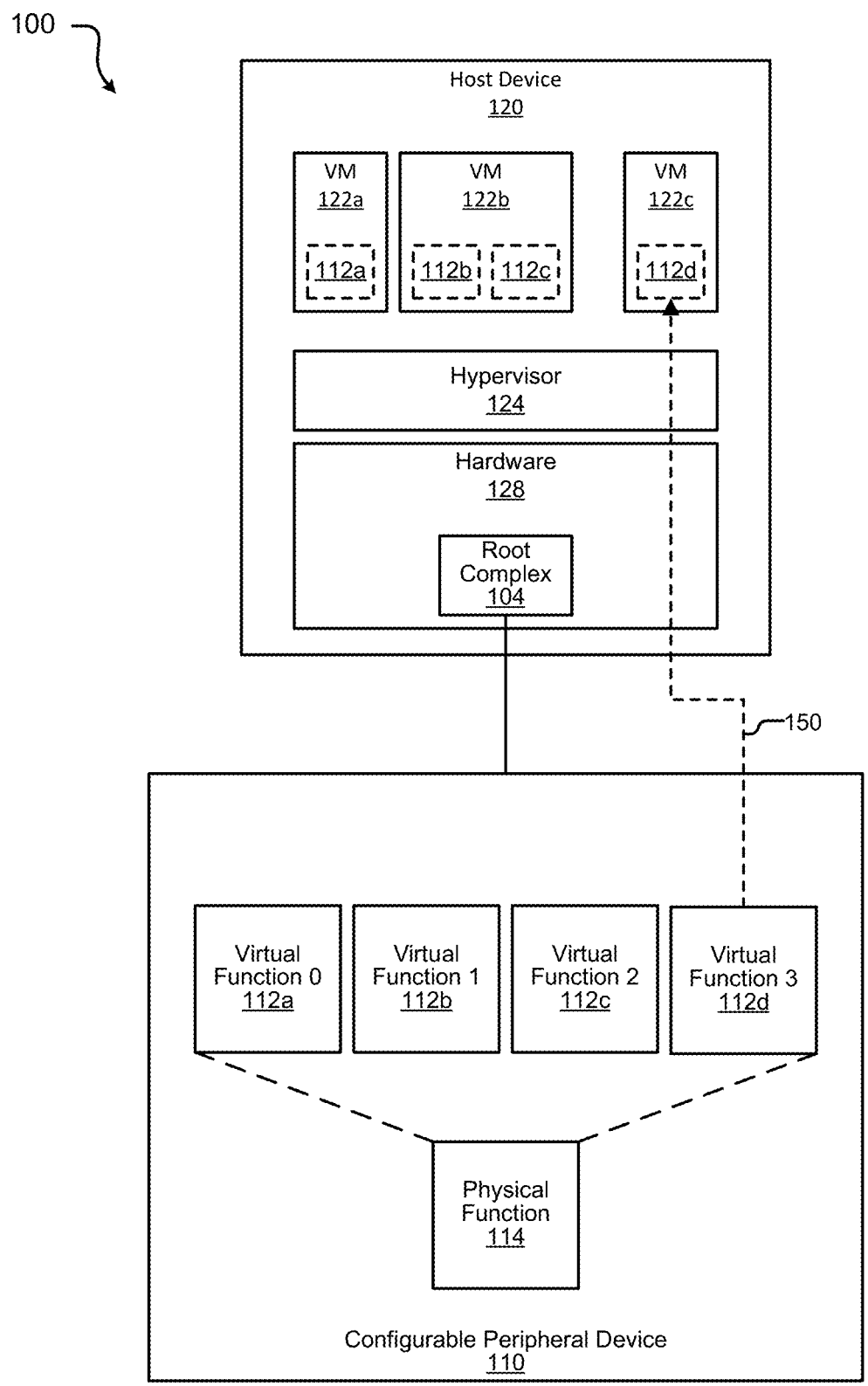

FIGS. 1A-1B illustrate an example of a system 100 that includes a configurable peripheral device 110. In this example, the configurable peripheral device 110 has been configured as a virtualized peripheral device, and thus can be used to dynamically add peripheral devices (which are virtual, in this example) to virtual machines 112a-112c executing on a host device 120. In various implementations, the system 100 can include additional peripheral devices, including other configurable peripheral devices.

The configurable peripheral device 110 is a device that, in various implementations, can emulate the functionality of a variety of different peripheral devices. As discussed further below, the configurable peripheral device 110 can include integrated circuits configured to emulate particular hardware functionality, such as a network interface, a storage device, a graphics processing unit, or some other functionality. To enable the configurable peripheral device 110 to emulate different peripheral devices, the configurable peripheral device 110 can include emulation configurations for the different devices, stored in a memory. In various implementations, the configurable peripheral device 110 can include firmware that can select an emulation configuration, and can configure the configurable peripheral device 110 according to the emulation configuration. In some implementations, the firmware may determine the configuration of the configurable peripheral device 110. In some implementations, the host device 120 may provide instructions for determining the configuration of the configurable peripheral device 110.

In the example of FIGS. 1A-1B, the configurable peripheral device 110 has been configured to include at least one physical function 114 and a number of virtual functions 112a-112d that correspond to the physical function 114. A virtual function is hardware and/or software that enable the configurable peripheral device 110 to present the physical function 114 to the host device 120 as multiple, distinct devices that each have the functionality of the physical function 114. The configurable peripheral device 110 can manage sharing of the physical function 114 by the virtual functions 112a-112d. For example, the configurable peripheral device 110 can manage switching between the contexts of the virtual functions 112a-112d, scheduling transactions coming from each of the virtual functions 112a-112d, and ensuring transaction response from the physical function 114 are routed to the correct virtual functions 112a-112d.

The configurable peripheral device 110 can have a fixed number of virtual functions for a particular physical function. In the illustrated example, the configurable peripheral device 110 has four virtual functions 112a-112d that correspond to the physical function 114. In other examples, the configurable peripheral device 110 can have fewer or more virtual functions for a particular physical function 114. In some implementations, the number of virtual functions 112a-112d for the physical function 114 can be increased or decreased by rebooting the configurable peripheral device 110 and reconfiguring the emulation.

A physical function can include hardware and software to support particular peripheral device functionality (e.g., a network interface, a storage device, a graphics processing unit, or some other functionality), though in the illustrated example, the physical function 114 is being emulated by the configurable peripheral device 110. Because the physical function 114 is emulated, in some implementations, the configurable peripheral device 110 may not have hardware specific to the physical function 114, or may have some hardware and software to enable the configurable peripheral device 110 to emulate various different peripheral devices. In some implementations, the configurable peripheral device 110 can include hardware processors that can assist in emulating the functionality of particular peripheral devices. In some implementations, the configurable peripheral device 110 can be configured to have multiple physical functions, each having corresponding virtual functions. In some examples, the configurable peripheral device 110 can be emulating SR-IOV.

The host device 120 of the example system 100 can be a computing system such as a server. The host device 120 can include hardware 128, such as one or more integrated circuits configured as processors and/or memory, integrated circuits that include the firmware for the BIOS, electrical traces that form a processor bus, circuits that drive an internal clock, systems that control power, and so on. The hardware 128 can also include a root complex 104, which can enable the host device 120 to communicate with a bus complex. Various peripheral devices, including the configurable peripheral device 110, can be connected to the bus complex, and can be considered part of the hardware of the host device 120. In some cases, the configurable peripheral device 110 can be connected to a switch or bridge in the bus complex, or can be connected directly to a port of the root complex 104. In some examples, the root complex 104 can include multiple ports, each of which can be connected to a different bus complex.

In some examples, the host device 120 can be configured for use by multiple different users or operators, or for different uses by the same operator. In these examples, the host device 120 can include a hypervisor 124 that can execute and manage multiple virtual machines 122a-122c. In the illustrated example, the hypervisor 124 supports virtualized peripheral devices. When the host device 120 conducts device discovery on the configurable peripheral device 110, the host device 120 can identify the virtual functions 112a-112d configured for the physical function 114 of the configurable peripheral device 110. The host device 120 can then add the virtual functions 112a-112d to the hypervisor 124, and the hypervisor 124 can treat the virtual functions 112a-112d as multiple distinct, physical devices. In some cases, the hypervisor 124 need not be aware that the virtual functions 112a-112d are virtual, and thus may not need to manage sharing of the physical function 114.

A management task of the hypervisor 124 can include assigning hardware resources, such as the virtual functions 112a-112d, to the virtual machines 122a-122c. In some cases, the hypervisor 124 can be configured to give a virtual machine 122a-122c exclusive use of a hardware resource. For example, in the example illustrated in FIG. 1A, a first virtual function, Virtual Function 0 112a, has been assigned to a first virtual machine 122a while a second and third virtual functions, Virtual Function 1 112b and Virtual Function 2 112c, have both been assigned to a second virtual machine 122b. A fourth virtual function, Virtual Function 3 112d, remains unassigned. In this example, the first virtual machine 112a has exclusive use of Virtual Function 0 112a and the second virtual machine 122b has exclusive use of Virtual Function 1 112b and Virtual Function 2 112c. By giving the virtual machines 122a-122b exclusive use of the virtual functions, the hypervisor 124 need not manage sharing of the resource by the virtual machines 122a-122b.

From the point of view of the virtual machines 122a-122b, the virtual functions 112a-112d assigned to each virtual machine 122a-122b appear no different than physical peripheral devices. For example, each virtual function 112a-112d can have a distinct address space, which can include configuration registers. As a further example, each virtual function 112a-112d can be configured independently, though because the virtual functions 112a-112d correspond to the same physical function 114, some configurations may need to remain common, and thus may have restrictions on being altered.

FIG. 1B illustrates an example where the hypervisor 124 has brought up a new virtual machine 122c. When the new virtual machine 122c comes up (e.g., before or shortly after the operating system boots) or a period of time after the new virtual machine 122c has come up, the new virtual machine 122c may request attachment of a peripheral device that corresponds to the physical function 114 of the configurable peripheral device 110. For example, the physical function 114 can be a network interface, and the new virtual machine 122c may request addition of a network interface to the virtual peripherals of the new virtual machine 122c. This request can be received by the hypervisor 124.

In the illustrated example, the hypervisor 124 can determine that Virtual Function 3 112d is not assigned to any virtual machine. The hypervisor 124 can internally associate Virtual Function 3 112d with the new virtual machine 122c, and can then "hot-plug" Virtual Function 3 112d into the new virtual machine 122c, as indicated by the dashed arrow 150.

Hot-plugging into the new virtual machine 122c can include triggering a hot-plug mechanism in the virtual hardware and/or software of the new virtual machine 122c. For example, the hypervisor 124 can send a signal that is equivalent to power signal to the virtual hardware, to indicate that a new (virtual) device is receiving power from the virtual hardware. In this example, the virtual BIOS can add Virtual Function 3 112d to the inventory of virtual hardware of the new virtual machine 122c. As another example, the hypervisor 124 can send a signal that is equivalent to an interrupt to the guest operating system. In this example, the interrupt can trigger a hot-plug procedure in the guest operating system. The hot-plug procedure can include, for example, conducting device discovery and configuring Virtual Function 3 112d. Device discovery can include sending requests for information about the new, virtual peripheral device to Virtual Function 3 112d. Configuring Virtual Function 3 112d can include sending configuration transactions to the virtual function, where the configuration transactions can include reading device identifiers and assigning address spaces, among other things. In some cases, the guest operating system can also launch or enable a device driver for Virtual Function 3 112d.

Once the hot-plug procedure completes, the guest operating system and applications of the new virtual machine 122c can use Virtual Function 3 112d as though having exclusive use of a particular peripheral device whose functionality corresponds to the physical function 114. The configurable peripheral device 110 can manage the actual sharing of the physical function 114.

The new virtual machine 122c may be shut down or removed at some later point in time. When this occurs, in some cases, the hypervisor 124 can execute a hot-plug removal procedure. The hot-plug removal procedure can include, for example, sending a signal to the virtual hardware of the new virtual machine 122c to indicate that Virtual Function 3 112d is no longer receiving power, and/or sending an interrupt to the guest operating system to indicate that the guest operating system should remove any address spaces assigned to Virtual Function 3 112d and/or conduct other operations to remove Virtual Function 3 112d from among available virtual devices.

In some cases, the new virtual machine 122c may not shut down gracefully, or may not initiate a hot-plug removal procedure for some other reason. In these cases, the hypervisor 124 can internally disassociate Virtual Function 3 112d from any virtual machine. In some cases, the hypervisor 124 can also send transactions to Virtual Function 3 112d to make the virtual function ready for use by another virtual machine.

In some cases, a hypervisor may not support virtualized peripheral devices, or a system may not have a hypervisor. The latter is the case in a "bare metal" system, in which lacks any virtual environments and instead uses only applications installed directly on the physical hardware of the system. A bare metal system can also be referred to as a dedicated computing system, where the physical resources of the computing system have been assigned to only one user or operator. Bare metal systems can occur frequently in cloud computing. For example, in a data center that is providing a computing cloud, applications can be launched on a dedicated computing system at any time, and the computing system stays up should the application be shut down or moved to another computing system. Bare metal systems can be implemented without a hypervisor. Removing the hypervisor can remove some operating overhead, and thus possibly speed up the operation of the system.

Figure 2A:
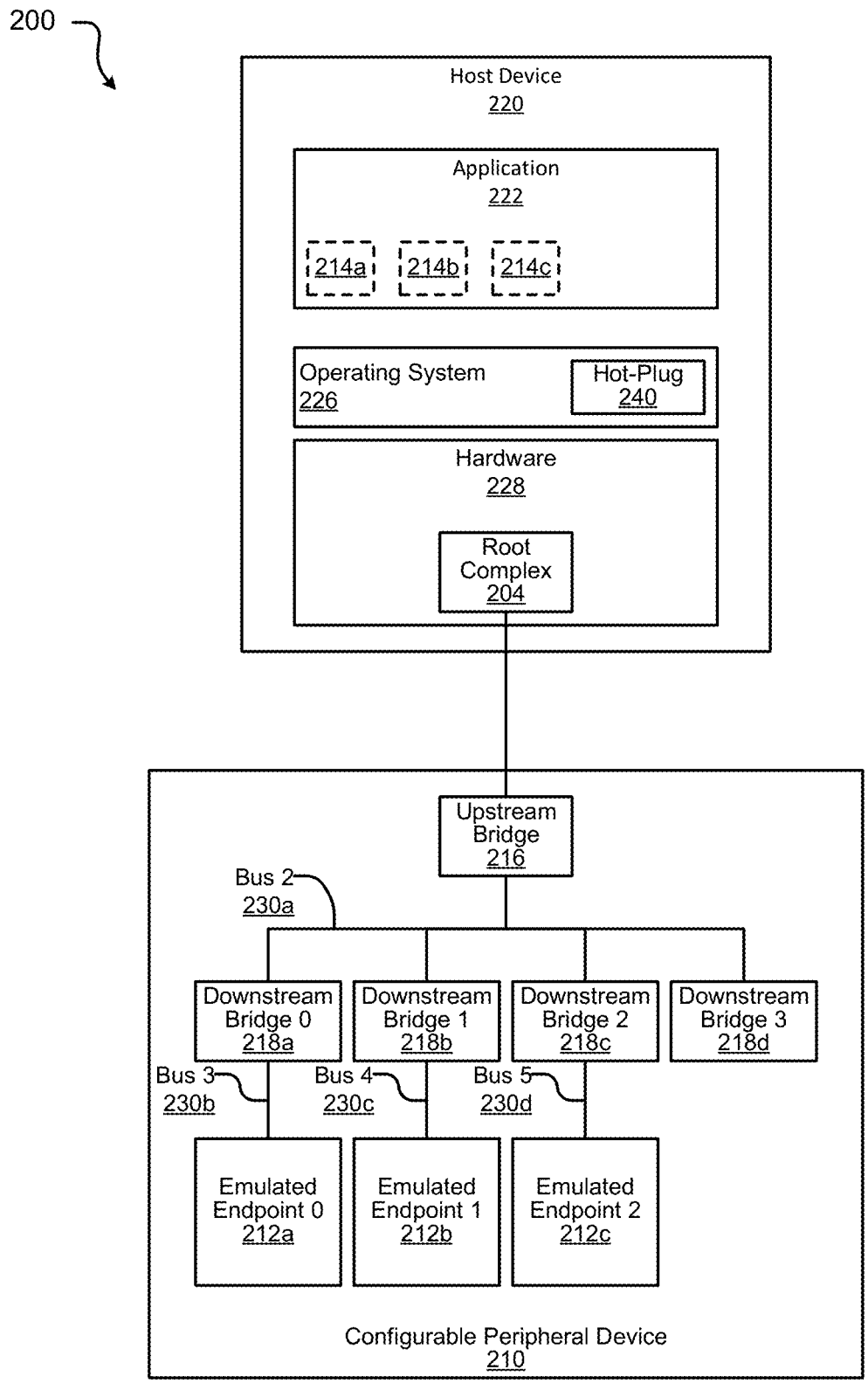
FIGS. 2A-2B illustrate an example of a system that includes a configurable peripheral device.
Figure 2B:
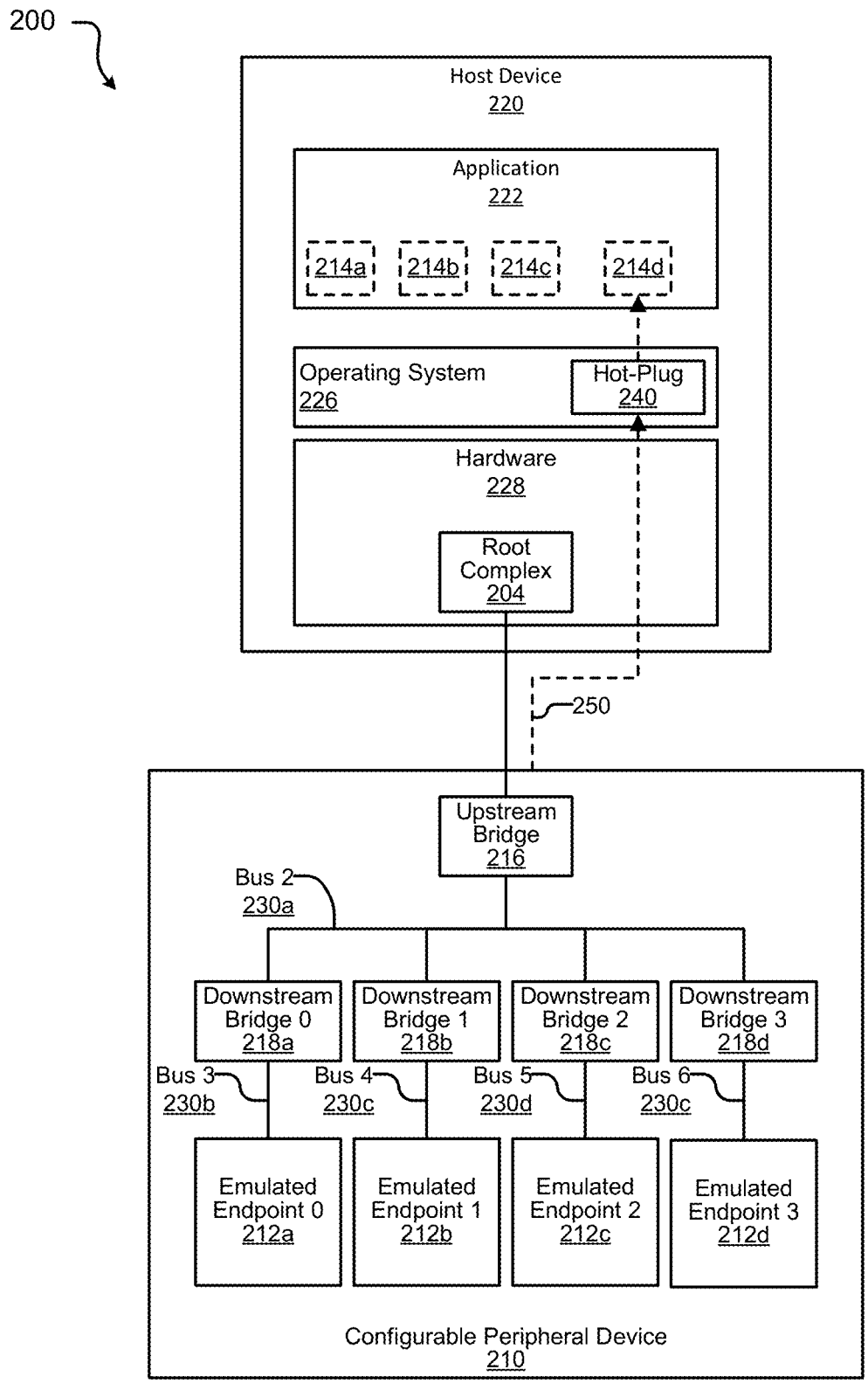

When a computing system does not have a hypervisor, or the hypervisor does not support virtualized peripheral devices, then, in various implementations, a configurable peripheral device can be used to enable peripheral devices to be dynamically added or removed from the system. FIGS. 2A-2B illustrate an example of a system 200 that includes a configurable peripheral device 210. In this example, the configurable peripheral device 210 has been configured to emulate a switch, and can further emulate a number of endpoints, where each endpoint can represent a distinct, emulated peripheral device. In various implementations, the system 200 can include additional peripheral devices, including other configurable peripheral devices.

In the example of FIGS. 2A-2B, the configurable peripheral device 210 has been configured as a switch component of a bus complex and a number of emulated endpoints 212a-212c. A switch, in this context, is a device that enables multiple peripheral devices (also referred to as endpoints), bridges, and/or other switches to be added to a bus complex. Switches can be used when a bus has been designed for point-to-point communication between no more than two devices connected to the bus. Switches can include internal bridging capabilities and an internal bus complex. In the example of FIGS. 2A-2B, the switch components are being emulated by the configurable peripheral device 210.

In the illustrated example, the emulated switch components of the configurable peripheral device 210 include an upstream bridge 216, multiple downstream bridges 218a-218d, and a bus, identified as Bus 2 230a, that connect the bridges. The upstream bridge 216 can connect the configurable peripheral device 210 to the root complex 204 of the host device 220, or to a bus that is in the direction of the root complex 204 (e.g., in the "upstream" direction). In some cases, the upstream bridge 216 can include a port that connects the upstream bridge 216 to the bus complex. The upstream bridge 216 can also include a port that connects the upstream bridge 216 Bus 2 230a.

In the example of FIG. 2A, Downstream Bridge 0 218a is connected to a first emulated endpoint, Emulated Endpoint 0 212a, Downstream Bridge 1 218b is connected to a second emulated endpoint, Emulated Endpoint 1 212b, and Downstream Bridge 2 218c is connected to a third emulated endpoint, Emulated Endpoint 2 212c. A fourth downstream bridge, Downstream Bridge 3 212d, remains unconnected in the downstream direction (e.g., away from the host device 220). The busses that connect each of the emulated endpoints 212a-212c to a corresponding downstream bridges 218a-218c can each have distinct identifier (Bus 3 230b, Bus 4 230c, and Bus 5 230d, in the illustrated example), which can be used by the system 200 to identify the emulated endpoints 212a-212c. For example, a bus number in combination with a device number and a function number can be used to individually identify the upstream bridge 216, each of the downstream bridges 218a-218d, and each of the emulated endpoints 212a-212c.

Each of the downstream bridges 218a-218d can include an upstream port to connect the downstream bridges 218a-218d in the upstream direction to the upstream bridge 216. Each downstream bridges 218a-218d can also include a downstream port to connect each downstream bridge 218a-218d to a corresponding emulated endpoint 212a-212c. In the illustrated example, the downstream port of Downstream Bridge 3 218*d* can be configured as an endpoint and/or as an open slot, so that enumeration of Downstream Bridge 3 218*d* does not result in an error.

The emulated endpoints 212*a*-212*d* can each emulate a different peripheral device. The peripheral devices can be the same, or the peripheral devices can be different. For example, Emulated Endpoint 0 212*a* can be a storage device and Emulated Endpoint 1 212*b* and Emulated Endpoint 2 212*c* can both be network interfaces. As discussed further below, the configurable peripheral device 210 can dynamically generate the emulated endpoints 212*a*-212*d*, and thus can attach different endpoints, with different functionality, at each downstream bridges 218*a*-218*d*.

In the illustrated example, the configurable peripheral device 210 includes four downstream bridges 218*a*-218*d*, and thus can support up to four emulated endpoints. In other examples, the configurable peripheral device 210 can include fewer or more downstream bridges to support correspondingly fewer or more emulated endpoints. To modify the number of downstream bridges, the configurable peripheral device 210 can be rebooted and reconfigured with fewer or more downstream bridges.

The host device 220 of the example system 200 can be a computing system such as a server. The host device 220 can include hardware 228, such as one or more integrated circuits configured as processors and/or memory, integrated circuits that include the firmware for the BIOS, electrical traces that form a processor bus, circuits that drive an internal clock, systems that control power, and so on. The hardware 228 can also include a root complex 204, which can enable the host device 220 to communicate with a bus complex. Various peripheral devices, including the configurable peripheral device 210, can be connected to the bus complex, and can be considered part of the hardware of the host device 220. In some cases, the configurable peripheral device 210 can be connected to a switch or bridge in the bus complex, or can be connected directly to a port of the root complex 204. In some examples, the root complex 204 can include multiple ports, each of which can be connected to a different bus complex.

In some examples, the host device 220 can be a "bare metal" system, which includes an operating system 226 but does not include a hypervisor. As noted above, the host device 220 may be assigned to only one operator, and thus might not be executing any virtual machines. Instead, the host device 220 may be executing an application 222 on behalf of a user. The application 222 may be executing in a closed environment that restricts or controls the application's access to the operating system 226 and hardware 228. For example, it may be possible to restart the application 222 without rebooting the host device 220, or it may be possible to move the application 222 to another host device without having to restart the application 222.

In a bare metal example, the host device 220 is dedicated to only one user and all of the hardware resources are assigned to the application 222 being run by the user. In the illustrated example, each of the emulated endpoints 212*a*-212*c* are thus available for exclusive use by the application 222. For example, the application 222 may have access to device drivers 214*a*-214*c* that each correspond to an emulated endpoint 212*a*-212*c*. The device drivers 214*a*-214*c* can enable the application 222 to send transactions to the emulated endpoints 212*a*-212*c* and receive responses.

In other examples, the host device 220 may include a hypervisor, for example as part of the operating system 226, but the hypervisor may not be capable of supporting virtual functions. In these examples, the hypervisor may be able to assign different emulated endpoints 212*a*-212*c* to different virtual machines. Alternatively or additionally, the hypervisor may manage sharing of the emulated endpoints 212*a*-212*c* between different virtual machines.

In some examples, the operating system 226 in both a bare metal system and a system that includes a hypervisor can include a hot-plug driver 240. The hot-plug driver 240 can enable hot-plugging of hardware components (such as peripheral devices) into or out of the host device 220. For example, a network interface card can be physical added to the hardware 228 of the host device 220, for example to an empty slot in the bus complex. In this example, addition of the network interface card can trigger a signal to the operating system 226, such as an interrupt. The signal can be received by the hot-plug driver 240, which can execute steps to add the network interface to the known hardware of the host device 220 and steps to configure the network interface. The hot-plug driver 240 can also execute steps to remove a device that is unplugged from the host device 220 while the host device 220 is powered on.

In some cases, the host device 220 can also include hardware support for hot-plugging. For example, the host device 220 can include slots in the bus complex that can receive, detect, and power on hot-plugged devices. As another example, the BIOS and/or power system included with the motherboard may have functionality for adding a new device to the host device 220 while the host device 220 is in operation.

In various implementations, the configurable peripheral device 210 can emulate hot-plugging of an endpoint into one of the downstream bridges 218*a*-218*d*. FIG. 2B illustrates an example where a new emulated endpoint, Emulated Endpoint 3 212*d*, has been added to the configurable peripheral device 210. Added, in this context, means that the configurable peripheral device 210 has added Emulated Endpoint 3 212*d* as another device being emulated by the configurable peripheral device 210. To emulate Emulated Endpoint 3 212*d*, the configurable peripheral device 210 may have used an emulation configuration stored in on the configurable peripheral device 210, as discussed further below. The configurable peripheral device 210 can further have added a new bus, Bus 6 230*c*, to emulate the connection between Emulated Endpoint 3 212*d* and the available downstream bridge, Downstream Bridge 3 218*d*. In some cases, the configurable peripheral device 210 may also have reconfigured the downstream port of Downstream Bridge 3 218*d* to include make Emulated Endpoint 3 212*d* visible to the host device 220. Once the configurable peripheral device 210 has added Emulated Endpoint 3 212*d* to the devices being emulated by the configurable peripheral device 210, the configurable peripheral device 210 can trigger a hot-plug procedure.

In various implementations, the configurable peripheral device 210 may add and hot-plug Emulated Endpoint 3 212*d* at the request of the application 222 executing on the host device 220. For example, the user of the application 222 can request a new endpoint using, for example, a management interface provided by the system 200. In this example, the management interface can give the user access to the application 222 and the ability to control the operation of the application 222. In some examples, the management interface is part of a control plane for controlling the system 200. In some examples, the management interface can enable the user to reconfigured the hardware 228 of the host device 220, including adding and removing peripheral devices. For example, the user may request addition of a new storage device or removal of an existing network interface. In these and other examples, the physical hardware 228 of the host device 220 is not change, and instead the configurable peripheral device 210 generates, for example, an emulated storage device, and emulates hot-plugging of the new device (or emulates hot-plug removal of an existing emulated device).

Hot-plugging Emulated Endpoint 3 212d into Downstream Bridge 3 218d can include mimicking hot-plugging a physical device into host device 220. For example, in some cases, after a device has been added to a slot, a hot-plug service or driver can be informed by physically pressing a button associated with the slot, which can cause a status for the slot to be updated and an interrupt to be sent to the root complex 204, which can forward the interrupt to the hot-plug driver 240. In this example, the button can be released once an LED indicates that link training is complete and that the new device is properly connected to the host device 220. The operating system 226 can then initiate a routine to configure the new device. This routine can include sending reading registers emulated by Downstream Bridge 3 218d to determine information about Emulated Endpoint 3 212d. The routine can further include assigning any necessary resources, such as address spaces, to the new device.

In a similar fashion and in various implementations, the configurable peripheral device 210 can mimic the steps used to hot-plug a physical device. For example, once the configurable peripheral device 210 has started emulating Emulated Endpoint 3 212d, the configurable peripheral device 210 can emulate pressing of the physical button by changing a status for the downstream port of Downstream Bridge 3 218d and sending the same interrupt to the root complex 204, indicated by the dashed arrow 250. No physical device, however, needs to be added to the configurable peripheral device 210, and no physical button needs to be pressed. The configurable peripheral device 210 can further mimic link training or ignore link training, and send a signal to the operating system 226 to start configuration of Emulated Endpoint 3 212d. The operating system 226 can proceed with configuration as if configuring a physical device.

The application's user may at some later point determine that Emulated Endpoint 3 212d can be removed from the system 200. For example, the application 222 may be experiencing lower usage and may no longer need a storage volume or network interface. Alternatively or additionally, the user of the application 222 may have reallocated resources or processes to another computing device. As another example, the application 222 may be being shut down and is releasing the resources assigned to it. In these and other examples, application's user may notify the configurable peripheral device 210 that Emulated Endpoint 3 212d can be removed. For example, the user can be provided with a management interface that enables the user to control the operation of the application 222 and/or modify the hardware 228 of the host device 220.

Hot-plug removal of Emulated Endpoint 3 212d can mimic removal of a physical device. For example, in some cases, removing of a physical device can be initiated by pressing a physical button associated with the slot into which the physical device is inserted. Pressing of the button can modify a status of the slot and send an interrupt to the root complex 204, which can pass the interrupt to the hot-plug driver 240. The operating system 226 can initiate a routine to remove the physical device, including, for example, de-assigning resources assigned to the device. The button can be released once an LED indicates that the physical device can be safely removed.

In various implementations, the configurable peripheral device 210 can mimic the hot-plug removal procedure used to remove a physical device. For example, the configurable peripheral device 210 can mimic pressing of a physical button by changing the status of the downstream port of Downstream Bridge 3 218d and sending the same interrupt to the root complex 204 complex that indicates a device is being removed. No physical button, however, needs to be pressed. In some implementations, the configurable peripheral device 210 can further wait a period of time to mimic link disconnect steps executed by the hardware, or can ignore link disconnect steps. The configurable peripheral device 210 can then shut down, remove, delete, and/or de-allocate Emulated Endpoint 3 212d, after which Emulated Endpoint 3 212d is removed from the devices being emulated by the configurable peripheral device 210.

The example of FIGS. 2A-2B illustrates an emulated switch with a flat hierarchy, in which the upstream bridge 216 is directly connected to each of the downstream bridges 218a-218d, and the downstream bridges 218a-218d are directly connected to emulated endpoint devices 212a-212d. In other examples, the emulated switch can be configured with a cascaded hierarchy. In a cascaded hierarchy, the downstream bridges 218a-218d can be connected to other emulated switches and bridges. For example, a downstream bridge 218a-218d to an upstream bridge of second emulated switch structure, where the second emulated bridge structure includes additional downstream bridges. A cascaded hierarchy is one method in which the configurable peripheral device 210 can provide a larger number of downstream bridges.

In various implementations, the switch structure emulated by the configurable peripheral device can emulate switch features, such as peer-to-peer transactions. In a peer-to-peer transaction, an endpoint (e.g., Emulated Endpoint 0 212a) can generate a transaction that is addressed to another endpoint (e.g., Emulated Endpoint 3 212d). In this example, without peer-to-peer support in the emulated switch, the transaction traverses up to root complex 204 and is then directed back through the emulated switch to Emulated Endpoint 3 212d. With peer-to-peer support, the transaction is directed directly from Downstream Bridge 0 218a to Downstream Bridge 3 218d, without first going up to the root complex 204.

Another switch feature that can be emulated by the emulated switch is access control services. Access control services can provide the host device 220 with control over peer-to-peer transactions, among other things. For example, through the access control services, the operating system 226 can enable or disable the emulated switch's ability to execute peer-to-peer transactions.

Figure 3:
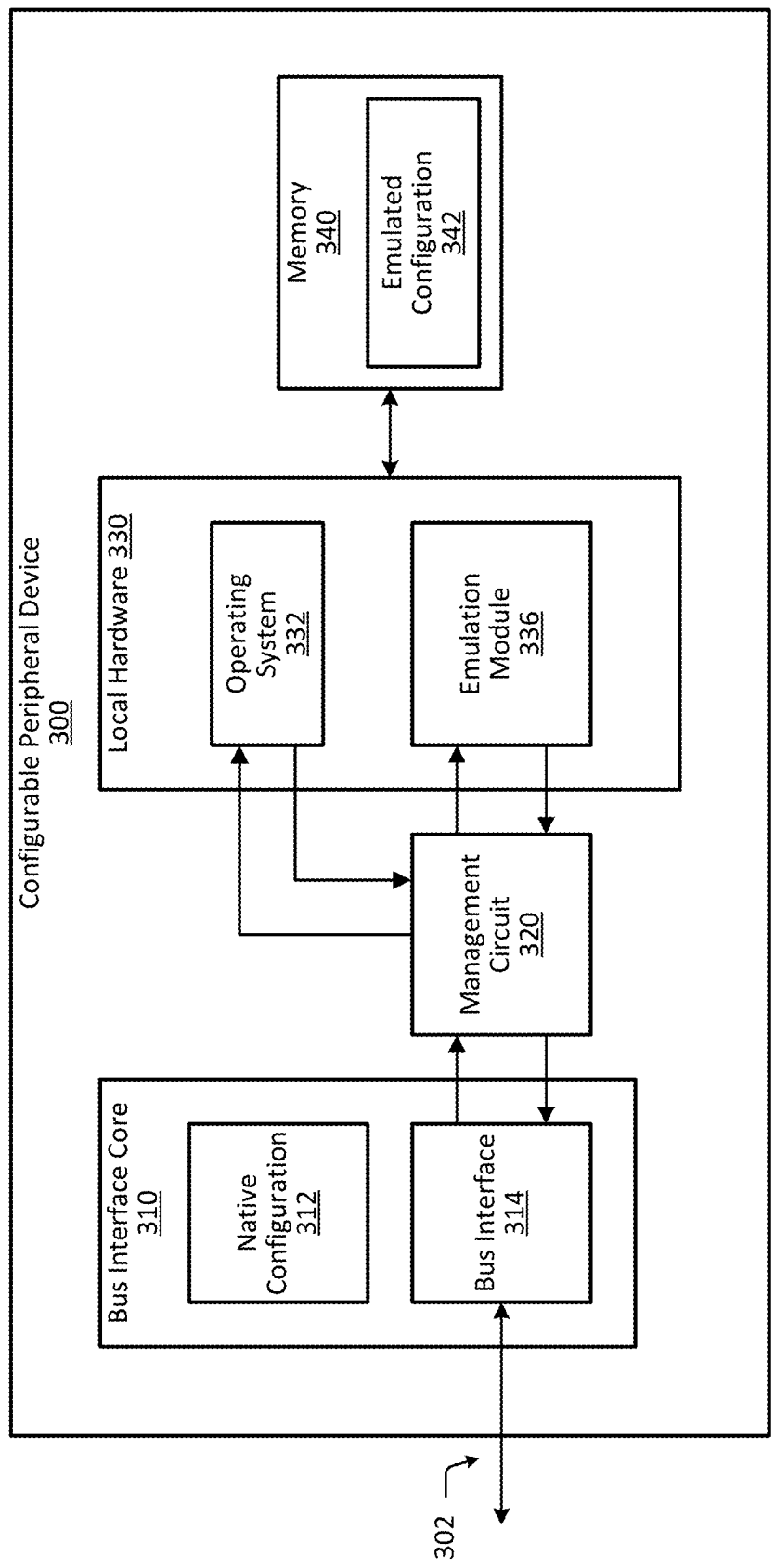
FIG. 3 illustrates an example of a configurable peripheral device that is capable of emulating various peripheral devices.

FIG. 3 illustrates an example of a configurable peripheral device 300 that is capable of emulating various peripheral devices. In various implementations, the configurable peripheral device 300 can be used to emulate the virtual functions and physical function example illustrated in FIGS. 1A-1B or to emulate the switch components and endpoints illustrated FIGS. 2A-2B. In various implementations, the configurable peripheral device 300 can also be used to replace one or more of the endpoints and/or root complexes illustrated in FIG. 5.

The configurable peripheral device 300 of FIG. 3 can implement any bus protocol, such as the PCI family of protocols, ISA, EISA, VESA, Multi-Channel, etc. A bus protocol may provide definitions for configuration registers, including addresses for the configuration registers, that a peripheral device is expected to include. In various implementations, the configurable peripheral device 300 can emulate at least part of the configuration address space that is defined for a particular bus protocol. In some cases, the configurable peripheral device 300 can also include configuration registers that are not emulated, such as configuration registers for implementing the basic functionality of the peripheral device (e.g., for setting bus speed, etc.), and/or basic functionality common to all peripheral devices that implement a specific bus protocol. These non-emulated configuration registers may be referred to as "native" configuration registers.

In some implementations, emulation refers to the ability of a program or device to imitate another program or device. For example, the configurable peripheral device 300 can include an emulated configuration space to emulate the function or functions of different peripheral devices. For example, the configurable peripheral device 300 can emulate a video card in one context, and a mass storage device in another context. As another example, the configurable peripheral device 300 can be emulating a function manufactured by one company, and may be able to emulate a peripheral device, manufactured by a different company, that implements the same function. In some implementations, the configurable peripheral device 300 can be used to emulate more than one peripheral device. In some implementations, the configurable peripheral device 300 can emulate an entire peripheral subsystem.

In various implementations, the configurable peripheral device 300 can include a bus interface core 310, a management circuit 320, local hardware 330, and a memory 340. The configurable peripheral device 300 can be in communication with a computing system over a bus 302. The bus 302 may implement a specific bus protocol.

The bus interface core 310 can include integrated circuits and/or firmware required by the configurable peripheral device 300 to communicate with the bus 302. For example, the bus interface core 310 can include a bus interface 314 for communicating with the bus 302. The bus interface 314 can include a physical connection to the bus 302, including circuitry to manage any electrical properties of the link to the bus 302. The bus interface 314 can further include logic for synchronizing to the bus 302, decoding incoming transactions and encoding outgoing transactions, and/or detecting and possibly managing errors in incoming or outgoing data, among other operations. This logic can be implemented, for example, using purpose built integrated circuits and/or firmware.

In various implementations, the bus interface core 310 can also include a native configuration space 312. In peripheral devices that do not include an emulated configuration space, the bus interface core 310 can include all the configuration registers of the peripheral device, as defined, for example, by the bus protocol. In these peripheral devices, the bus interface core 310 can service all read and write transactions (which may also be referred to as configuration access requests or configuration accesses) to the configuration registers, and provides a response (if necessary) to the bus 302. In contrast, in the example configurable peripheral device 300, the native configuration space 312 can include native configuration registers that are a subset of the configuration registers that are defined by the bus protocol. For example, the native configuration registers can be associated with basic functionalities that may be common to all peripheral devices for a given bus protocol (e.g., registers for setting bus speed, for error reporting, for reporting interrupts, etc.), and/or may otherwise be configuration registers that are unnecessary or inconvenient to emulate. In some implementations, the native configuration space 312 can also be emulated.

In some implementations, the bus interface core 310 can detect read and write transactions addressed to the native configuration space 312. In these implementations, the bus interface core 310 can service configuration transactions directed to the native configuration space 312. In various implementations, when the bus interface 314 receives a configuration transaction that is addressed to configuration registers that is not within the native configuration space 312, the bus interface 314 can direct the configuration transaction to the management circuit 320. In some implementations, the bus interface core 310 directs all configuration read and write transactions, regardless of where the transactions are addressed to, to the management circuit 320, and the management circuit 320 can determine whether a transaction is for the native configuration space 312 or for an emulated configuration space.

In various implementations, the management circuit 320 can provide management of read and write transactions directed to peripheral devices being emulated by the configurable peripheral device 300. Read and write transaction directed to the configurable peripheral device 300 can include, for example, transactions to configuration registers, transactions directed to memory on board the configurable peripheral device 300 or accessible through the configurable peripheral device 300, transactions directed to I/O device(s) accessible through the configurable peripheral device 300, and/or messaging transactions (by which a host can send messages to the configurable peripheral device 300), among other types of transactions. In various implementations, the management circuit 320 can be implemented as a circuit on an Application Specific Integrated Circuit (ASIC) or a Field Programmable Gate Array (FPGA). Alternatively or additionally, in some implementations, the management circuit 320 can be implemented as a circuit on a System-on-a-Chip (SoC). In some implementations, the management circuit 320 can be a circuit on a SoC that also includes local processor(s). In some implementations, the management circuit 320 can be implemented using firmware, where the firmware runs on ASIC and/or FPGA on the configurable peripheral device 300.

Upon receiving a transaction, the bus interface core 310 can log the transaction with the management circuit 320. The bus interface core 310 can continue with other operations, without needing to wait for the logged transaction to complete. Transactions can be read from the transaction log and be serviced by the local hardware 330, for example, whenever the local hardware 330 is free to do so. The local hardware 330 can remove a transaction from the log when the transaction is read, which may indicate that the transaction has been completed. Alternatively or additionally, the local hardware 330 can remove the transaction after the transaction has been executed and/or responded to, also signaling completion of the transaction. Alternatively or additionally, the local hardware 330 may have some other mechanism (e.g. a register or a flag) that indicates to the logging mechanism that a transaction has been serviced or is in the process of being serviced.

The local hardware 330 can include one or more local processors, one or more local processor cores, a local processor cluster, programmable gate arrays, or integrated circuits configured to process transactions. In implementations that include multiple processors or processor cores, each processor or processor core can independently or cooperatively execute software code. In these implementations, each processor or processor core may be able to service multiple transactions from the management circuit 320 in parallel. In implementations that include one processor, the processor may be multi-threaded, and may also be able to service multiple transactions in parallel. In various implementations, the local hardware 330 can also be executing an operating system 332. The operating system 332 can be a commercial operating system, such as Linux, Windows®, iOS®, etc., or may be a proprietary operating system.

In various implementations, the local hardware 330, using one or more local processors, can process transactions logged by the management circuit 320. For example, the local processor(s) can execute a memory or I/O write, including locating the appropriate address space, reading a value from the appropriate address, and returning the value in a response transaction. For example, when the configurable peripheral device 300 is emulating a network interface card, the local processor(s) can manage the transmission and receipt of packets. As another example, when the configurable peripheral device 300 is emulating a storage device, the processor(s) may manage the reading and writing of blocks of data to and from emulated disks. The local hardware 330 can also include other hardware for executing transactions. For example, the local hardware 330 may include hardware for routing packets and/or transferring data to and from hard disks. In some implementations, the processor(s) may execute specialized software for executing some types of transactions, such as configuration transactions.

In various implementations, the local hardware 330 can also include an emulation module 336. In various implementations, the emulation module 336 can be implemented using an integrated circuit configured to execute the emulation module 336. For example, an ASIC, FPGA, or SoC can execute firmware that implements the emulation module 336. As another example, the local hardware 330 can include an integrated circuit configured to execute microcode that implements the emulation module 336. As another example, the local hardware 330 can include an ASIC, FPGA, or SoC purpose built to implement the emulation module 336.

In various implementations, the emulation module 336 can receive transactions from the management circuit 320, and an service those transactions. Servicing a transaction can include, for example, identifying the transaction's type (e.g., read and/or write), identifying the source of the transaction, identifying the destination for the transaction, executing the transaction, and/or generating a response to the transaction, as needed. For example, a configuration read transaction can include reading a configuration register and responding with the information read from the register. As another example, a configuration write transaction can include updating the contents of the configuration register. In some cases, a configuration write can be responded to with an acknowledgment that the write transaction has completed.

In various implementations, because incoming transactions may require fast response times, the emulation module can be executed in a secure environment or be executed with sufficient privileges such that processing of the transactions cannot be interrupted by the operation of, for example, the operating system 332.

In various implementations, the emulation module 336 can determine whether a configuration transaction is directed to the native configuration space 312 or to an emulated configuration space 342. When a configuration transaction is directed to the native configuration space 312, the emulation module 336 can communicate with the bus interface core 310 to read or write a native configuration register. When a configuration read is directed to emulated configuration space 342, the emulation module 336 can read a value representing the contents of the configuration register from the emulated configuration space 342. When a configuration write is directed to the emulated configuration space 342, the emulation module 336 can write or update data in the emulated configuration space 342 that represents the contents of the configuration register. In some cases, a configuration transaction can be directed to configuration registers associated with one or more functions, in which case the emulation module 336 can identify the function and access an emulated configuration register that is specific to that function. In some cases, a configuration transaction may have come from one of multiple sources, such as one of several virtual machines that may be running different operating systems. In these cases, the emulation module 336 may identify the source, and access the emulated configuration register that may be designated or suitable for that source.

In various implementations, the memory 340 can provide storage for data that may be operated on by the local hardware 330. The memory 340 can include DRAM, (e.g., SDRAM, DDR-SDRAM), SRAM, flash, or some other memory type, or any combination thereof. In some implementations, the memory 340 can be implemented as an external memory module, or as an internal memory of the configurable peripheral device 300, or a combination of external and internal memory. In various implementations, the memory 340 can store an emulated configuration space 342. The emulated configuration space 342 can include representations for all or some of the configuration register address spaces defined for any number of peripheral devices. In some implementations, the emulated configuration space 342 can include configuration space that may affect the operation of a function being emulated by the configurable peripheral device 300. In some implementations, the emulated configuration space 342 excludes native configuration registers that may be basic and/or common to all peripheral devices implementing the bus protocol, or that may be unnecessary or inconvenient to emulate. The emulated configuration registers can include fields that are read only, clear-on-read (or have clear-on-read bits), may be both readable and writeable, may be write-zero-to-clear (or have write-zero-to-clear bits), and/or be write-one-to-set (or have write-on-to-set bits).

The emulated configuration space 342 can be stored in memory 340 as a text file, source code, object code, as a script, and/or in some other format that is readable by the emulation module 336. In some implementations, the emulated configuration space 342 may be encrypted. In some implementations, the emulated configuration space 342 can be modified or replaced. For example, additional emulated configuration registers, or updated versions of the emulated configuration registers, may be provided through a website on the Internet. In these implementations, the additional or updated emulated configuration registers can be downloaded from the Internet and uploaded to the memory 340. In some implementations, the memory 340 may store multiple emulated configuration spaces 342, or multiple versions of the same emulated configuration space 342.

Figure 4:
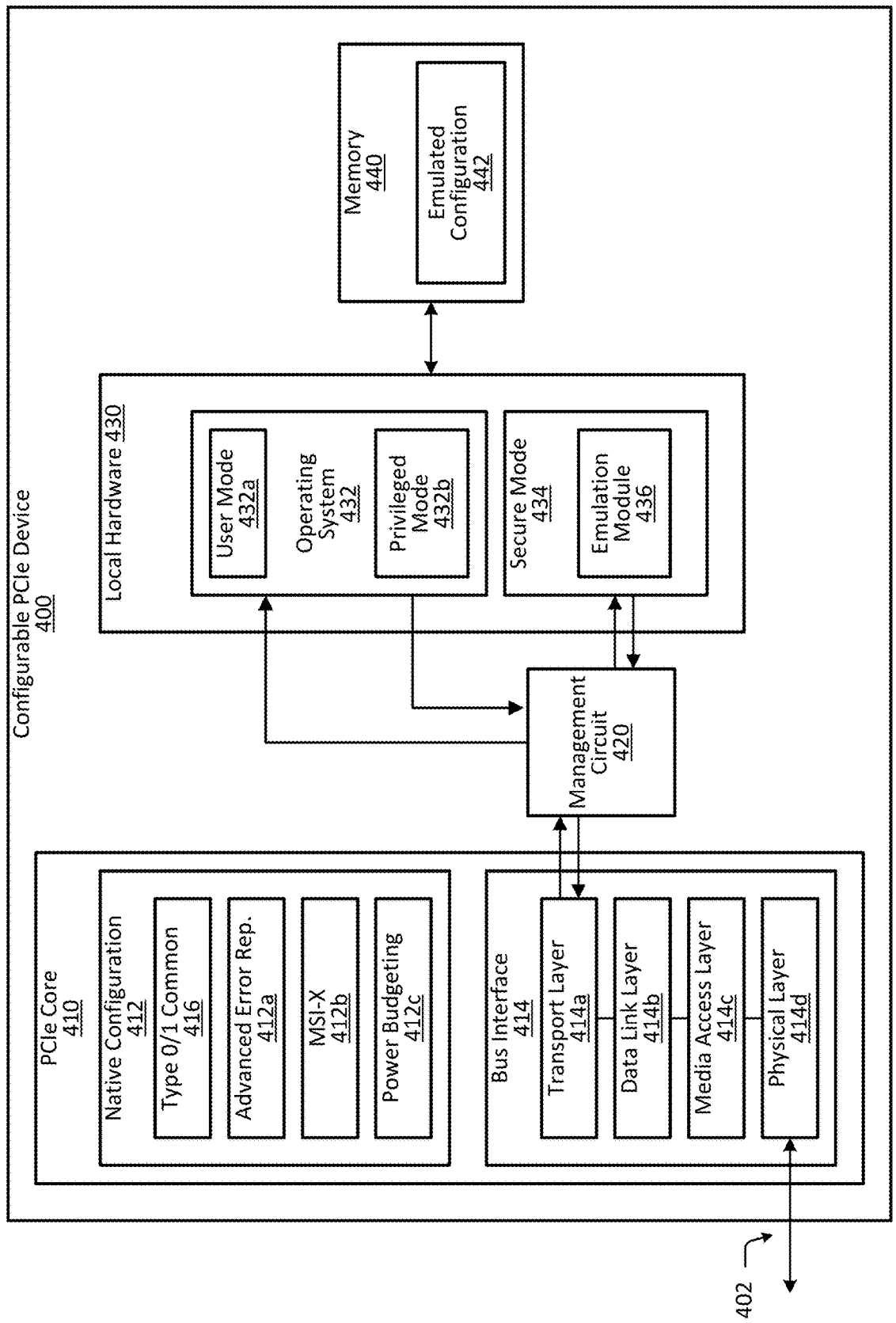
FIG. 4 illustrates an example of a PCIe implementation of a configurable peripheral device.

FIG. 4 illustrates an example of a PCIe implementation of a configurable peripheral device. The configurable PCIe device 400 of FIG. 4 can be connected to bus that implements the PCIe protocol. Additionally, the configurable PCIe device 400 can emulate various different peripheral devices. The configurable PCIe device 400 can include a PCIe core 410, a management circuit 420, local hardware 430, and a memory 440. The configurable PCIe device 400 may communicate with a computing system through a bus 402. The bus 402 may implement the PCIe protocol.

In various implementations, the PCIe core 410 can include at least some of the functionality required to support communications with a PCIe bus. The PCIe core 410 can include a bus interface 414. In various implementations, the bus interface 414 can implement network protocol layers 414a-414d that manage incoming and outgoing transactions. For outbound transactions, the transport layer 414a can form a packet with information provided by a transaction initiator, which may be, for example, the PCIe core 410, the management circuit 420, or the local hardware 430. The data link layer 414b can add additional information to the packet, such as, for example, packet header information and/or error checking information that can be used by the recipient of the transaction to validate the integrity of the packet. The media access layer 414c can provide addressing information such as physical address of the source and destination of the transaction. The physical layer 414d can encode the packet into electrical signals and transmit the packet onto the bus 402. For incoming transactions, the physical layer 414d can accept a packet from the bus 402 and decode the packet. The media access layer 414c can process the source and destination address of the transaction. The data link layer 414b can parse the packet header information and check for errors. The transport layer 414a can convert the information contained in the packet into a format that can be processed by the PCIe core 410 and/or the local hardware 430.

In various implementations, the PCIe core 410 can also include a native configuration space 412. The native configuration space 412 can include configuration registers that are associated with basic functionality, and/or that may be common to all PCIe-based peripheral devices, and/or that may be unnecessary or inconvenient to emulate. Examples of such registers include a Type 0/1 common register header 416, Advanced Error Reporting capability registers 412a, Message Signaled Interrupts extended (MSI-X) capability registers 412b, and power budgeting capability registers 412c, among others. In various implementations, other configuration register space can be found, for example, in the emulated configuration space 442. In some implementations, the native configuration space 412 can also be emulated. In some implementations, all PCI configuration registers for a PCIe-based peripheral device can be emulated.

In various implementations, the PCIe core 410 can detect read and write transactions addressed to the native configuration space 412. In these implementations, the PCIe core 410 can service configuration transactions directed to the native configuration space 412. When the PCIe core 410 receives a configuration transaction that is addressed to a configuration space that is not within the native configuration space 412, the PCIe core 410 can direct the configuration transaction to the management circuit 420. In other implementations, the PCIe core 410 directs all configuration read and write transactions to the management circuit 420, regardless of whether they are addressed to the native configuration space 412 or the emulated configuration space 442.

In various implementations, the management circuit 420 can provide management of read and write transactions directed a device being emulated by the configurable PCIe device 400, including memory, I/O, configuration, and messaging transactions, among others. In various implementations, the management circuit 420 can be implemented as a circuit on an ASIC or an FPGA. Alternatively or additionally, in some implementations, the management circuit 420 can be implemented as a circuit on a SoC. In some implementations, the management circuit 420 can be implemented using firmware, where the firmware runs on ASIC and/or FPGA on the configurable PCIe device 400.

In some implementations, the management circuit 420 may provide transaction logging. Logged transactions are temporarily stored for later executing by the local hardware 430. Upon receiving a transaction, the PCIe core 410 may log the transaction with the management circuit 420. The PCIe core 410 may then continue with other operations. Transactions may be read from the log and be serviced by the local hardware 430. The local hardware 430 may remove a transaction from the log when the transaction is read, or may remove the transaction after the transaction has been executed and responded to, or otherwise indicate in the log that the transaction has been serviced or is in the process of being serviced.

In various implementations, the local hardware 430 can include one or more processors, one or more processor cores, a processor cluster, programmable gate arrays, or control logic circuitry adapted to process configuration transactions. In some implementations, the local hardware 430 can run an operating system 432. The operating system 432 can provide a user mode 432a and a privileged mode 432b. The user mode 432a can execute, for example, user applications that have been loaded into the configurable PCIe device 400. The privileged mode 432b can execute system functions.

In various implementations, the local hardware 430, using one or more local processors, can process transactions logged by the management circuit 420. For example, the local processor(s) can execute a memory or I/O write, including locating the appropriate address space, reading a value from the appropriate address, and returning the value in a response transaction. The local hardware 430 can also include other hardware for executing transactions. In some implementations, the processor(s) can execute specialized software for executing some types of transactions, such as configuration transactions.

In various implementations, the local hardware 430 can also include a secure mode 434 of operation (e.g., ARM secure mode, or something similar). A program or software running in secure mode 434 can be isolated from other programs executing on the local hardware 430. For example, the operating system 432 and/or applications running on top of the operating system 432 may not be able to access modules running within the secure mode 434. Conversely, in some implementations, programs running within the secure mode 434 may not be able to influence processes running outside of the secure mode 434. Thus, the secure mode 434 may provide an environment in which a program can execute without intervention or interference from other programs that may be executing on the local hardware 430. In various examples, programs executing in the secure mode 434 can be highly optimized, and/or may have higher priority than other programs. In some implementations, the secure mode 434 can be implemented as a section of hardware and/or software that is logically and/or physically isolated within the local hardware 430.

In some implementations, an emulation module 436 can be implemented as integrated circuit in the local hardware 430, and/or as emulation software being executed in the secure mode 434. The emulation software can be referred to as ConfigSpace Emulation Software (CSES). In various implementations, the emulation module 436 can receive transactions, including configuration transactions, from the management circuit 420, and can service those transactions. For example, servicing a configuration read transaction can include reading a configuration register from an emulated configuration space, and responding with the information read from the register. As another example, servicing a configuration write register can include updating the contents of the configuration register in the emulated configuration space. In some cases, a configuration write can be responded to with an acknowledgment that the write transaction completed.

In some implementations, the emulation module 436 can receive some or all configuration transactions directed to the peripheral device. In some implementations, the emulation module 436 can determine whether a configuration transaction is directed to the native configuration space 412 or the emulated configuration space 442. When a configuration transaction is directed to the native configuration space 412, the emulation module 436 can communicate with the PCIe core 410 to read or write the native configuration register. In some implementations, management circuit can handle native configuration register accesses without involving emulation module 436. When a configuration read is directed to the emulated configuration space 442, the emulation module 436 can read a value representing the contents of the configuration register from the emulated configuration space 442. When a configuration write is directed to the emulated configuration space 442, the emulation module 436 can write or update data in the emulated configuration space 442 that represents the configuration register. In some implementations, the emulation module 436 may itself emulate one or more configuration registers internally. In such implementations, the emulation module 436 can read or write an internal representation of a configuration register, and may not need to access the emulated configuration space 442.

In some implementations, the emulation module 436 may make use of the PCI interrupt mechanism to process the emulated configuration register accesses. For example, the emulation module 436 can define the PCIe core 0 interrupt as a secure interrupt, and register a handler to this interrupt. An interrupt handler can be an independent software function that is triggered when an interrupt is received. When the PCIe core 0 interrupt is triggered, the emulation module 436 can be alerted and can begin servicing transactions from the management circuit 420. By defining the PCIe core 0 interrupt as secure, the interrupt may be hidden, or masked from non-secure modules, such as the operating system 432. In some implementations, a secure interrupt may also interrupt a non-secure interrupt handler.

In various implementations, the memory 440 provides storage for data that can be operated on by the local hardware 430. The memory 440 can include DRAM, (e.g., SDRAM, DDR-SDRAM, etc.), SRAM, flash memory, or some other memory type or combinations thereof. In some implementations, the memory 440 can be implemented as an external memory module, or as an internal memory of the configurable peripheral device 300, or a combination of external and internal memory. In various implementations, the memory 440 can store an emulated configuration space 442. The emulated configuration space 442 can include representations for all or some of the 4 KB configuration address space that is defined for PCIe devices. In some implementations, the emulated configuration space 442 can include PCIe extended capability registers. For example, the emulated configuration space 442 may include Advanced Error Reporting capability registers, Virtual Channel capability registers, Device Serial Number registers, and/or Power Budgeting capability registers among others. Alternatively or additionally, the emulated configuration space 442 can include Single Root-I/O Virtualization (SR-IOV) extended capability registers. In these cases, the emulated configuration space 442 can include capability registers that allow SR-IOV physical and virtual functions to be controlled. SR-IOV is discussed in further detail below.

In some implementations, the emulated configuration space 442 can be dynamically replaced and/or modified. For example, PCIe extended capabilities can be added or removed in emulated configuration space 442. In other implementations, the configurable PCIe device 400 can include multiple emulated configuration spaces for emulating different peripheral devices.

In various implementations, the management circuit 420 can include transaction logging to track incoming transactions. The transaction logging can maintain a log of some or all incoming read and write transactions. In some implementations, the transaction logging can use several registers to log a given transaction. These registers can include an address register, a data register, and a completion register.

The address register can be set when a read or write transaction is transmitted to the transaction logging. The address register can contain information necessary to identify the register that is the target of the inbound transactions. In some cases, the address register may be cleared when read by emulation module 436. As an example, the address register can include information such as a valid indicator (that indicates whether the address register is valid), a transaction type, a target register offset, read/write indicator indicating whether the transaction is a read access or a write access, a device function field indicating which physical or virtual function is the target of the access, and a target bus number, among other things. In some implementations, setting the valid indicator may trigger an interrupt or low-latency notification to the emulation module 436 to request the emulation module 436 to service the access request.

The data register can store data associated with the transaction. For write transactions, the data register can store the data to be written. For read transactions, the data register can store the data read from the target configuration register by emulation module 436.

The completion register can indicate the status of a read or write transaction. The completion register can be written to by the local hardware 430 when the local hardware 430 completes a transaction. The values written to the completion register can be used to format a completion response that is sent to the initiator of the transaction (e.g., a root complex). For example, the values in the completion register can be used to generate a completion indication. In various examples, the completion indication can identify the bus number, device number, and/or function number of the peripheral device, and function that accepted and serviced the transaction. In some cases, when the local hardware 430 writes to the completion register, the pending configuration transaction is considered complete and can be released. In some cases, the completion register may be only written once for each inbound transaction.

As an example, the completion register can include information such as a completion status, a target bus number, a target device number, and a target function number. The completion status can indicate whether the transaction completed successfully, the transaction was invalid (e.g., the target function or target bus number may not exist), the transaction should be retried (e.g., the peripheral device could not accept the transaction, and the transaction should be transmitted again by transaction's initiator), or the transaction was aborted (e.g., the peripheral device accepted, but could not complete the transaction). The target bus number can indicate which bus number to use in the completion identifier (e.g., the target bus number provided in the address register is returned, or a bus number associated with target function is returned). For example, a peripheral device being emulated may reside on bus number 1. An inbound transaction can be Configuration Type 1 configuration transaction, and can be directed to bus number 2. In this case, the local hardware 430 can return either bus number 1 or 2. The target device number can indicate which target device number to use in the completion identifier (e.g., the target device number provided in the address register is returned, or a target device number associated with the target function is returned). The target function number can indicate which target function number to use in the completion identifier (e.g., the target function number provided in the address register is returned, or a port function number is returned).

Figure 5:
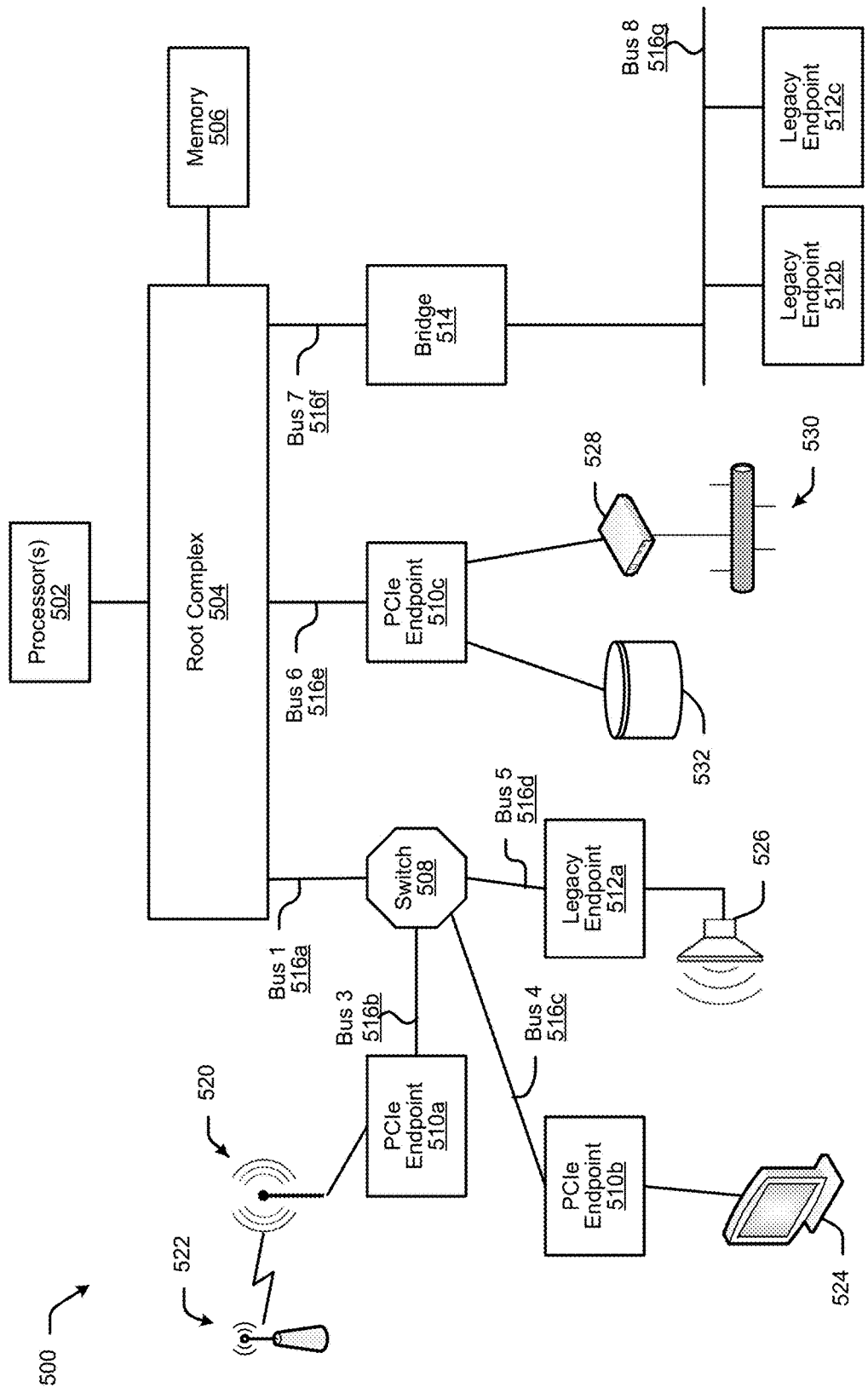
FIG. 5 illustrates an example of a computing system that includes multiple peripheral devices.

FIG. 5 illustrates an example of a computing system 500 that includes multiple peripheral devices. Peripheral devices can include hardware devices and/or devices that include a combination of hardware and software, which can be attached to a computing system to add functionality to the computing system 500. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 5 illustrates a computing system 500 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 5 can also include peripheral devices that implement bus protocols that are based on a PCI bus protocol, such as Non-Volatile Memory Express (NVMe), a bus protocol used for high-speed storage disks that operates on top of a PCIe bus.

In the example shown in FIG. 5, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 500 may include one or more processors 502, a root complex 504, a memory subsystem 506, a switch 508, a bridge 514, and a number of peripheral devices. In this example, the peripheral devices include PCIe endpoints 510a-510c and legacy endpoints 512a-512c. The processors 502 may be general purpose computing devices such as are manufactured by Intel®, AMD®, ARM®, Qualcomm®, an others. The processors 502 are hardware devices that can be implemented using an integrated circuit or a combination of integrated circuits. The processors 502 are generally capable of executing software code. A processor may include multiple processing cores.

The root complex 504 may be a hardware device or a hardware and software device that connects the processors 502 and the memory subsystem 506 to the peripheral devices. The peripheral devices may be connected directly to the root complex 504. For example, the PCIe endpoint 510c is connected directly to the root complex 504. Alternatively or additionally, the peripheral devices may be connected to the root complex 504 through a switch 508. A bridge 514 may also be connected to the root complex 504. The root complex 504 may forward transactions to the processors 502 and direct responses from the processors 502 back to the peripheral devices. The root complex 504 may further generate transactions on behalf of the processors 502, and forward responses to those transactions back to the processors 502. In some cases, the root complex 504 may also route transactions from one peripheral device to another, and/or between peripheral devices, switches, and bridges. The root complex 504 may provide services for the computing system 500, such as a hot plug controller, a power management controller, an interrupt controller, and/or error detection and reporting. In some implementations, the root complex 504 may be implemented as part of a host system that includes one or more integrated processors. In some cases, memory may also be integrated into the host system.

The memory subsystem 506 may provide temporary or long-term storage for data that may be used by the computing system 500. The memory subsystem 506 may include Dynamic Random Access Memory (DRAM), Synchronous DRAM (SDRAM), and/or Double Data Rate (DDR), among others. In some cases, the memory subsystem 506 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 504 may include a memory controller to manage transactions to and from the memory subsystem 506. In other implementations, the processors 502 may include a memory controller. Alternatively or additionally, the computing system 500 may include an external memory controller in communication with either the processors 502, the root complex 504, or both the processors 502 and the root complex 504, and the memory subsystem 506.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X.

Though not illustrated here, the computing system 500 may further include peripheral devices that implement another bus standard, such as for example, Small Computer System Interface (SCSI), Serial ATA (SATA), or Parallel ATA (PATA), among others.

The switch 508 functions as a multi-port connecter between various devices, including the root complex 504, peripheral devices, and possibly other switches and bridges. The switch 508 may route transactions between any of the devices connected to it. For example, the switch 508 may route transactions between the PCIe endpoints 510*a*-510*b* and the legacy endpoint 512*a*, and between the various endpoints 510*a*-510*b*, 512*a* and the root complex 504. The switch 508 may also provide arbitration to prioritize incoming and outgoing transactions. Devices connected to the switch 508 may treat the switch 508 as another requester and/or completer. Though not illustrated here, switches can also be connected to other switches to further expand the number of peripheral devices that can be connected to the computing system 500.

The bridge 514 may provide connectivity to other busses or switching fabrics. The other busses or switching fabrics may implement a PCI variant or another protocol. For example, in the example of FIG. 5, the bridge 514 provides connectivity to a bus implementing the original PCI standard. The bridge 514 may include mechanisms to translate from one bus protocol, such as the original PCI standard, to another protocol, such as PCIe.

Components in the computing system 500 may be connected through a shared bus. For example, in the illustrated example, the legacy endpoints 512*b*-512*c* are connected to a shared PCI bus 516*g*. Alternatively or additionally, peripheral devices may be connected to the computing system 500 in a switching fabric topology. The interconnected devices illustrated in FIG. 5, including the root complex 504, the switch 508, the bridge 514, and the PCIe endpoints 510*a*-510*c*, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 5, the switch 508 is connected to the root complex 504 with Bus 1 516*a* and the PCIe endpoint 510*c* is connected to the root complex with Bus 6 516*e*. Similarly, the bridge 514 is connected to the root complex with Bus 7 516*f*. Each of the PCIe endpoints 510*a*-510*b* and the legacy endpoint 512*a* are also connected to the switch 508 with individual busses 516*b*-516*d*. The connections between each of the root complex 504, the switch 508, the bridge 514, the PCIe endpoints 510*a*-510*c* and the legacy endpoint 512*a* are point-to-point because each of the busses 516*a*-516*g* are not shared with another device. Furthermore, a packet directed from one device to another (for example, from the root complex 504 to the PCIe endpoint 510*a*) is routed directly to its destination.

In some implementations, the connections between the devices in the computing system 500 may be numbered. For example, in the illustrated example, the connection between the switch 508 and the root complex 504 is labeled Bus 1 516*a* (Bus 0 may be internal to the root complex 504). Similarly, each of the busses connecting the PCIe endpoints 510*a*-510*b* and the legacy endpoint 512*a* to the switch 508 are labeled Bus 3 516*b*, Bus 4 516*c*, and Bus 5 516*d*, respectively (Bus 2 may be internal to the switch 508). Furthermore, the connection between the root complex 504 and the PCIe endpoint 510*c* may be labeled Bus 6 516*e*, while the connection between the root complex and the bridge 514 may be labeled Bus 7 516*f*. Finally, the shared bus downstream from the bridge 514 may be labeled Bus 8 516*g*. In most cases, the numbering of the busses is arbitrary, though bus numbers are generally assigned in a logical fashion. For example, Bus 0 may be located within the root complex 504, and the bus label may increment as the distance between the bus and the root complex 504 increases.

As noted above, peripheral devices may add to and/or modify the functionality of the computing system 500. For example, one PCIe endpoint 510*a* may implement a Wi-Fi adapter 520. Using the Wi-Fi adapter 520, the computing system 500 may be able to communicate wirelessly with a wireless access point 522, and thereby access a network. As another example, another PCIe endpoint 510*b* may implement a video card. A video card may include a port to connect a monitor 524 or other display device. As a further example, the computing system 500 may include a legacy endpoint 512*a* that implements a sound card. A sound card may include a port or jack that accepts a plug for a speaker 526 or other audio output device.

In some cases, a PCIe endpoint may be a multi-function device, that is, a device that provides the services of multiple devices. For example, the PCIe endpoint 510*c* may include an Ethernet adapter, and provide a connection to a gateway device 528, such as a DSL or cable modem. The PCIe endpoint 510*c* may also include a storage adapter, and provide a connection to a storage device 532. The one PCIe endpoint 510*c* thus may provide access to a network 530, as well as access to a storage device 532. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example, by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 510*c* may be a mass storage controller, while Function 1 may be a network interface.

When a computing system such as computing system 500 illustrated in FIG. 5 initially powers up, the processors 502 may be unaware of any peripheral devices that are connected to the system. The processors 502 may be aware of the root complex 504, and possibly also that the root complex 504 is connected to one or more busses. To learn about the rest of the system, the processors 502 may execute a process to scan and configure the system. This process may be referred to as an enumeration process. The specific process of scanning for, locating, and identifying peripheral devices may be called discovery or discovering. During an enumeration process, software executing on the processors 502 may first scan each of the busses 516*a*, 516*e*, 516*f* connected to the root complex 504, and identify the switch 508, the PCIe endpoint 510*c*, and the bridge 514. Upon discovering the switch 508, the processors 502 may next scan the busses 516b-516d connected to the switch 508. The processors 502 thereby discover the PCIe endpoints 510a-510b and the legacy endpoint 512a. Upon discovering the bridge 514, the processors 502 may also scan Bus 8 516g; however, the bridge 514 may translate the scanning instructions to the protocol implemented by Bus 8 516g.

While scanning the busses, or possibly after, the processors 502 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 502 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 502 may also read information from configuration registers. For example, the PCIe endpoint 510c may include a configuration register that indicates that it has two functions. The PCIe endpoint 510c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 508 and the bridge 514 also include a configuration space with configuration registers. In such implementations, the processors 502 may discover the switch and bridge functionality by reading configuration registers in the switch 508 and the bridge 514. The switch 508 and the bridge 514 may also be configured by the processors 502, for example with bus and device numbers.

Figure 6:
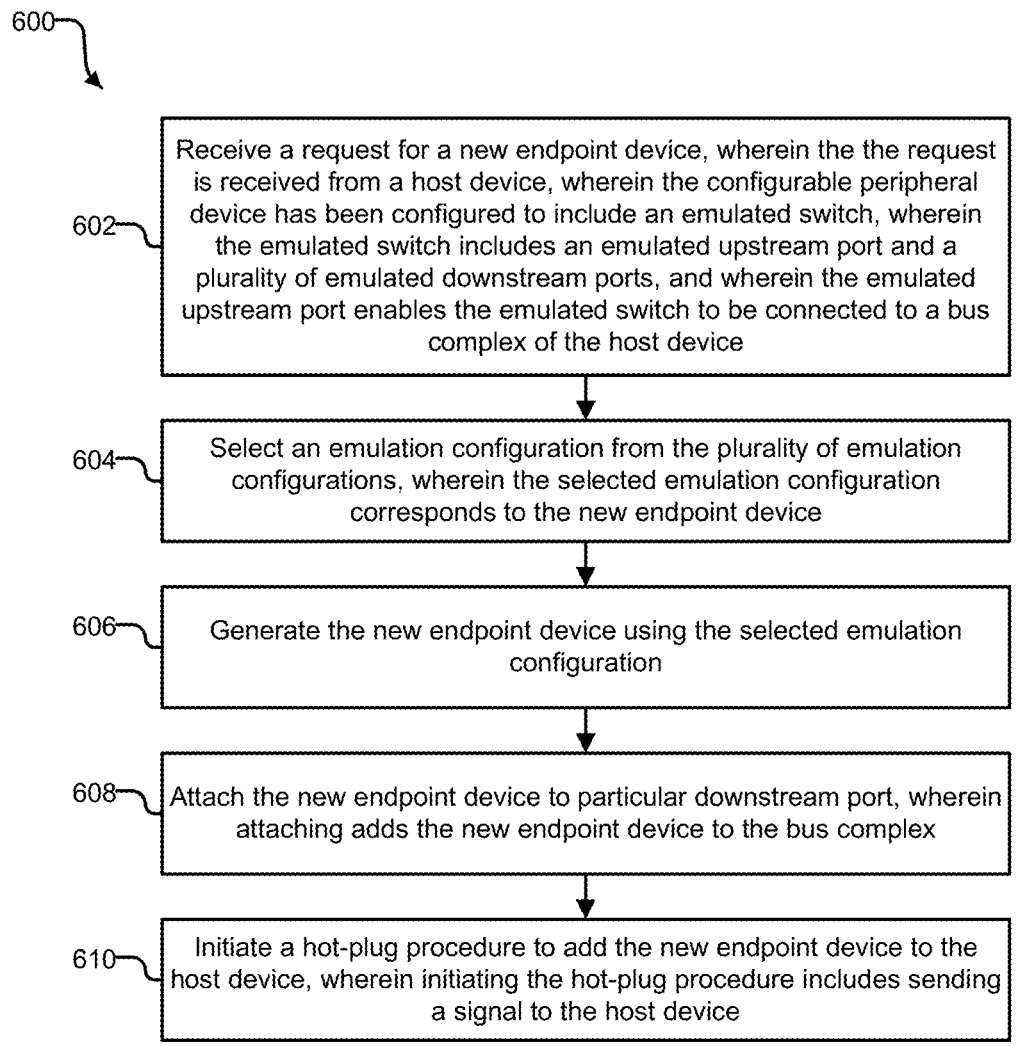
FIG. 6 illustrates an example of a process for adding an emulated peripheral device to a host device.

FIG. 6 illustrates an example of a process 600 for adding an emulated peripheral device to a host device. This may be implemented by the configurable peripheral devices described above.

At step 602, the process 600 includes receiving, by configurable peripheral device, a request for a new endpoint device. The request is received from a host device that the configurable peripheral device may be connected to. The configurable peripheral device may have been configured to include an emulated switch, where the emulated switch includes an emulated upstream port and a plurality of emulated downstream ports. An emulated upstream port can enables the emulated switch to be connected to a bus complex of the host device.

At step 604, the process 600 includes selecting an emulation configuration from a plurality of emulation configurations stored on the configurable peripheral device. The selected emulation configuration corresponds to the new endpoint device. For example, the emulation configuration can include an emulated configuration space for the new endpoint device.

At step 606, the process 600 includes generating the new endpoint device using the selected emulation configuration. Generating the new endpoint device can include, for example, assigning integrated circuit components to the new endpoint device, allocating memory space for the new endpoint device, and/or initializing a set of emulated configuration registers for the new endpoint device, among other things.

At step 608, the process 600 includes attaching the new endpoint device to a particular downstream port from the plurality of downstream ports. Attaching adds the new endpoint device to the bus complex emulated by the configurable peripheral device.

At step 610, the process 600 includes initiating a hot-plug procedure to add the new endpoint device to the host device. Initiating the hot-plug procedure includes sending a signal to the host device.

In various implementations, the process 600 can further include steps executed by the host device to discovery information about the new endpoint device, as part of the hot-plug procedure. These steps can include, for example, receiving a request for information about the new endpoint device. The request may be received from the host device. The steps can further include directing the request to the emulated upstream port, for routing through the emulated bus complex to the particular downstream bridge to which the new endpoint device is attached. The steps can further include receiving a response from the emulated upstream port, where the response was generated by the particular downstream bridge and/or the new endpoint device. The steps can further include transmitting the response to the host device.

In various implementations, the process 600 can further include steps for configuring the new endpoint device, as part of the hot-plug procedure. These steps can include, for example, receiving a configuration transaction for configuring the new endpoint device. The configuration transaction may be received from the host device. The steps can further include directing the configuration transaction to the emulated upstream port.

In various implementations, the process 600 can further include steps for directing transactions received by the configurable peripheral device to the new endpoint device, during steady-state operation of the configurable peripheral device. These steps can include, for example, directing a transaction addressed to the new endpoint device to the emulated upstream port. The emulated switch can then direct to the transaction to the new endpoint device. The steps can further include transmitting a response from the new endpoint device to the host device.

In various implementations, the process 600 can further include steps for removing the new endpoint device using a hot-plug remove procedure. These steps can include, for example, receiving a request to remove the new endpoint device. The request can be received from the host device. The steps can further include detaching the new endpoint device from the particular downstream port to which the new endpoint device is connected. The steps can further include deleting the new endpoint device, where deletion can include freeing hardware, software, and/or memory resources being used by the new endpoint device. The steps can further include initiating a hot-plug procedure to remove the new endpoint device.

Figure 7:
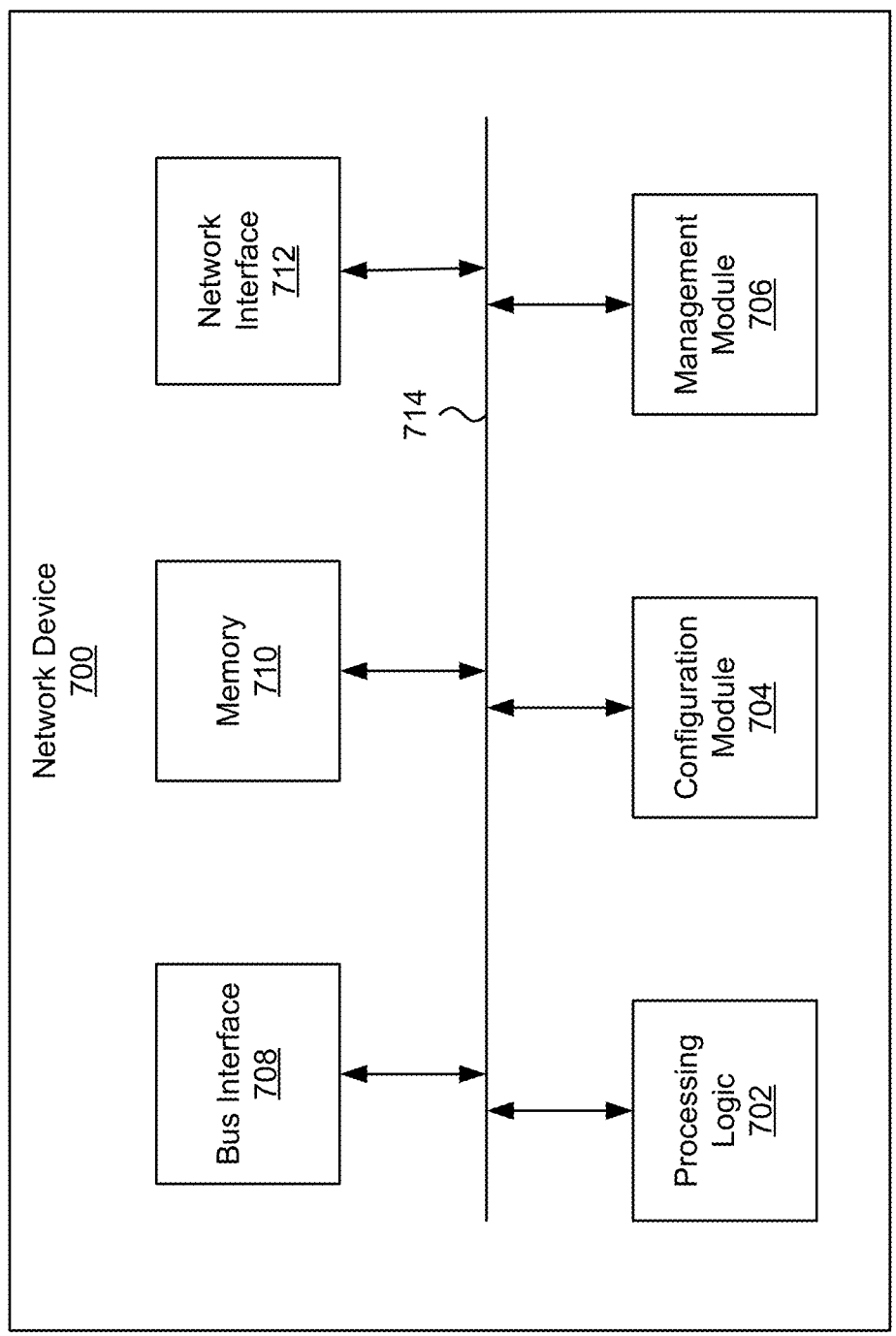
FIG. 7 illustrates an example of a network device, according to certain aspects of the disclosure.

FIG. 7 illustrates an example of a network device 700. Functionality and/or several components of the network device 700 may be used without limitation with other examples disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management circuit 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory 710 may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management circuit 706 may be configured to manage different components of the network device 700. In some cases, the management circuit 706 may configure one or more bits in one or more configuration registers at power up, to enable or disable certain capabilities of the network device 700. In certain implementations, the management circuit 706 may use processing resources from the processing logic 702. In other implementations, the management circuit 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 702.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 702.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some examples, the SoC or other component may be communicatively coupled to another computing system to provide various services such as traffic monitoring, traffic shaping, computing, etc. In some examples of the technology, the SoC or other component may include multiple subsystems as disclosed with respect to FIG. 8.

Figure 8:
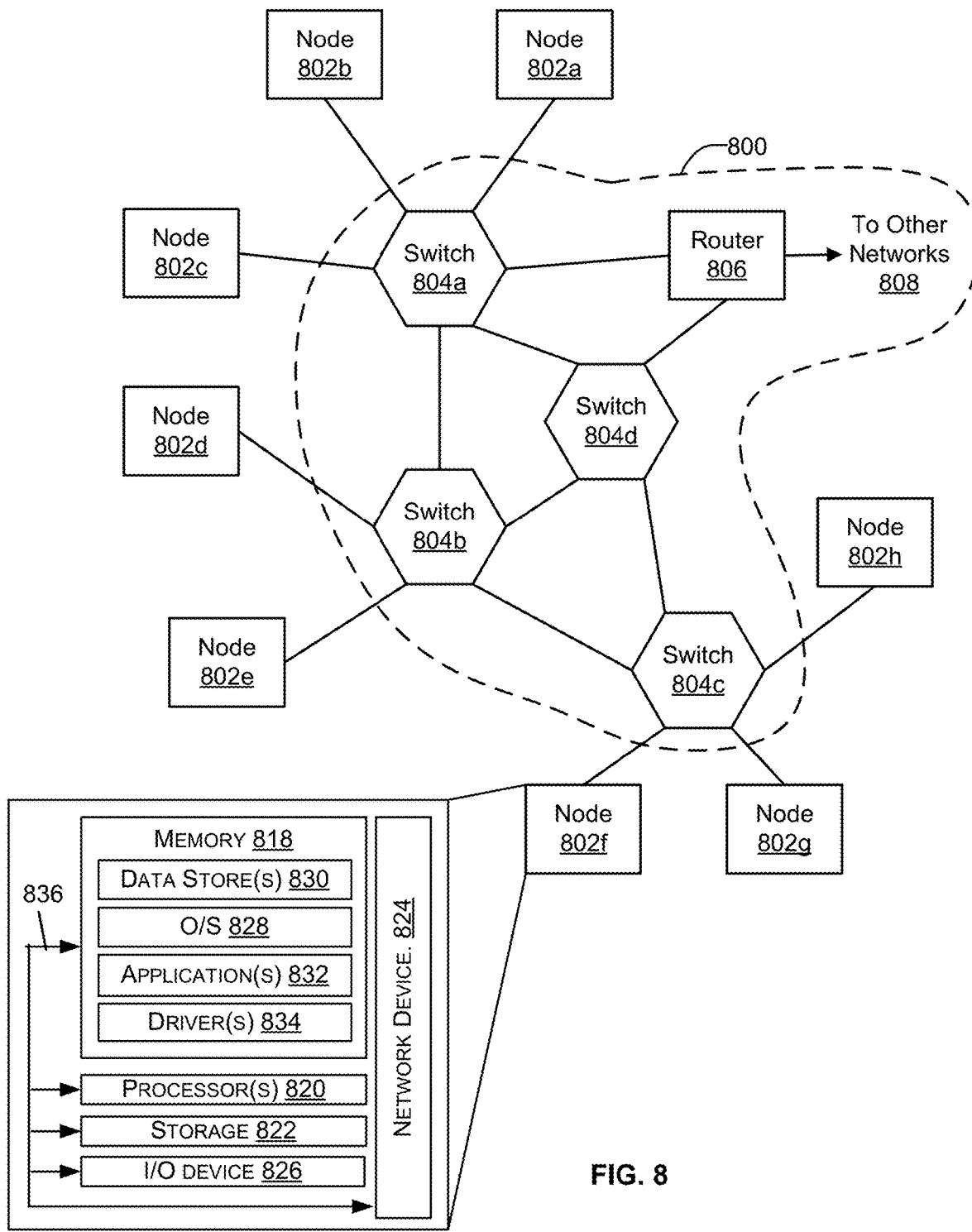
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain examples, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to the nodes 802*a*-802*h*. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802*a*-802*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device(s) 824 that allow the node(s) 802*a*-802*h* to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Peripheral Component Interconnect (PCI)-based peripheral device, comprising:
   an integrated circuit configured to execute an emulation module;
   a memory including a plurality of emulation configurations; and
   a management circuit configured to:
      configure the emulation module to include an emulated PCI switch, wherein configuring the emulation module includes using a PCI switch configuration from the plurality of emulation configurations, wherein the emulated PCI switch includes an emulated upstream bridge and a plurality of emulated downstream bridges;

receive a request from a host device for a new PCI endpoint device;

select an emulation configuration from the plurality of emulation configurations that corresponds to the new PCI endpoint device;

instruct the emulation module to generate the new PCI endpoint device, wherein the emulation module generates the new PCI endpoint device using the selected emulation configuration, and wherein the emulation module attaches the new PCI endpoint device to a particular downstream bridge from the plurality of emulated downstream bridges initiate a PCI hot-plug procedure for adding the new PCI endpoint device, wherein initiating the PCI hot-plug procedure includes sending an interrupt to the host device;

receive a request for information about the new PCI endpoint device from the host device;

direct the request for information to the emulated upstream bridge;

receive a response from the emulated upstream bridge, wherein the response includes a unique identifier for the new PCI endpoint device, wherein the unique identifier corresponds in part to the particular downstream bridge; and transmit the response to the host device.

2. The PCI-based peripheral device of claim 1, wherein the management circuit is further configured to:

receive a configuration transaction directed to the new PCI endpoint device, wherein the configuration transaction is received from the host device, and wherein the PCI hot-plug procedure includes the configuration transaction;

direct the configuration transaction to the emulated upstream bridge;

receive a second response to the configuration transaction from the emulated upstream bridge, wherein the second response includes the unique identifier; and transmit the second response to the host device.

3. The PCI-based peripheral device of claim 1, wherein the management circuit is further configured to:

receive a second request to remove the new PCI endpoint device, wherein the second request is received from the host device;

instruct the emulation module to delete the new PCI endpoint device; and initiate a PCI hot-plug procedure for removing the new PCI endpoint device.

4. A peripheral device, comprising:

an integrated circuit configured to execute an emulation module;

a memory include a plurality of emulation configurations; and a management circuit configured to:

configure the emulation module to include an emulated switch, wherein the emulated switch includes an emulated upstream port and a plurality of emulated downstream ports, and wherein the emulated upstream port enables the emulated switch to be connected to a bus complex of a host device;

receive a request for a new endpoint device, wherein the request is received from the host device;

select an emulation configuration from the plurality of emulation configurations that corresponds to the new endpoint device;

instruct the emulation module to generate the new endpoint device, wherein the emulation module generates the new endpoint device using the selected emulation configuration, and wherein the emulation module attaches the new endpoint device to a particular downstream port from the plurality of emulated downstream ports;

initiate a hot-plug procedure to add the new endpoint device, wherein initiating the hot-plug procedure includes sending a signal to the host device;

receive a request for information about the new endpoint device from the host device;

direct the request for information to the emulated upstream port;

receive a response from the emulated upstream port, wherein the response includes a unique identifier for the new endpoint device, wherein the unique identifier corresponds in part to the particular downstream port; and transmit the response to the host device.

5. The peripheral device of claim 4, wherein the emulation module uses the selected emulation configuration to determine the response.

6. The peripheral device of claim 4, wherein the management circuit is further configured to:

receive a configuration transaction for configuring the new endpoint device, wherein the configuration transaction is received from the host device, and wherein the hot-plug procedure to add the new endpoint device includes the configuration transaction; and direct the configuration transaction to the emulated upstream port.

7. The peripheral device of claim 4, wherein the emulated switch is configured with a flat hierarchy, wherein, in the flat hierarchy, the emulated upstream port is directly connected to each of the emulated downstream ports.

8. The peripheral device of claim 4, wherein the emulated switch is configured with a cascaded hierarchy, wherein, in the cascaded hierarchy, an emulated downstream port is directly connected to a second emulated upstream port, and wherein the second emulated upstream port is directly connected to a set of emulated downstream ports.

9. The peripheral device of claim 4, wherein, when a second emulated downstream port from the plurality of emulated downstream ports receives a peer-to-peer transaction to the new endpoint device, the emulated switch directs the peer-to-peer transaction from the second emulated port to the particular downstream port.

10. The peripheral device of claim 4, wherein the emulated switch emulates access control services.

11. The peripheral device of claim 4, wherein the emulation module includes a second emulated endpoint device connected to a second emulated downstream port from the plurality of emulated downstream ports, wherein a functionality provided by the second emulated endpoint device is different from a functionality provided by the new endpoint device.

12. The peripheral device of claim 4, wherein the management circuit is further configured to:

receive a second request to remove the new endpoint device, wherein the second request is received from the host device;

instruct the emulation module to delete the new endpoint device; and initiate a hot-plug procedure to remove the new endpoint device.

13. The peripheral device of claim 4, wherein the host device includes a hypervisor, and wherein the hypervisor does not support virtualized peripheral devices.

14. The peripheral device of claim 4, wherein the host device does not include a hypervisor.

15. The peripheral device of claim 4, wherein the new endpoint device is associated with a virtual machine executing on the host device.

16. The peripheral device of claim 4, wherein the integrated circuit includes a processor configured to execute a plurality of instructions, including instructions for executing the emulation module.

17. The peripheral device of claim 4, wherein the integrated circuit includes circuitry for executing the emulation module.

18. The peripheral device of claim 4, wherein the peripheral device is a Peripheral Component Interconnect Express (PCIe) device.

19. The peripheral device of claim 4, wherein the management circuit is configured to use a PCIe hot-plug procedure for the hot-plug procedure.

20. A method, comprising:
    receiving, by configurable peripheral device, a request for a new endpoint device, wherein the request is received from a host device, wherein the configurable peripheral device has been configured to include an emulated switch, wherein the emulated switch includes an emulated upstream port and a plurality of emulated downstream ports, and wherein the emulated upstream port enables the emulated switch to be connected to a bus complex of the host device;
    selecting an emulation configuration from the plurality of emulation configurations stored on the configurable peripheral device, wherein the selected emulation configuration corresponds to the new endpoint device;
    generating the new endpoint device using the selected emulation configuration;
    attaching the new endpoint device to a particular downstream port from the plurality of emulated downstream ports, wherein the attaching adds the new endpoint device to the bus complex;
    initiating a hot-plug procedure to add the new endpoint device to the host device, wherein initiating the hot-plug procedure includes sending a signal to the host device;
    receiving, by the configurable peripheral device, a request for information about the new endpoint device, wherein the request for information is received from the host device, and wherein the hot-plug procedure to add the new endpoint device includes the request for information;
    directing the request for information to the emulated upstream port;
    receiving a response from the emulated upstream port, wherein the response includes a unique identifier for the new endpoint device, wherein the unique identifier corresponds in part to the particular downstream port; and
    transmitting the response to the host device.

21. The method of claim 20, further comprising:
    receiving, by the configurable peripheral device, a configuration transaction for configuring the new endpoint device, wherein the configuration transaction is received from the host device, and wherein the hot-plug procedure to add the new endpoint device includes the configuration transaction; and
    directing the configuration transaction to the emulated upstream port.

22. The method of claim 20, further comprising:
    directing, by the configurable peripheral device, a transaction addressed to the new endpoint device to the emulated upstream port, wherein the emulated switch directs the transaction to the new endpoint device; and
    transmitting a second response from the new endpoint device to the host device, wherein the second response is received at the emulated upstream port.

23. The method of claim 20, further comprising:
    receiving, by the configurable peripheral device, a second request to remove the new endpoint device, wherein the second request is received from the host device;
    detaching the new endpoint device from the particular downstream port;
    deleting the new endpoint device; and
    initiating a second hot-plug procedure to remove the new endpoint device.

\* \* \* \* \*